US008455141B2

(12) United States Patent
Nakamura et al.

(10) Patent No.: US 8,455,141 B2
(45) Date of Patent: Jun. 4, 2013

(54) POLYMER ELECTROLYTE AS WELL AS POLYMER ELECTROLYTE MEMBRANE, MEMBRANE ELECTRODE ASSEMBLY AND POLYMER ELECTROLYTE FUEL CELL USING THE SAME

(75) Inventors: Masataka Nakamura, Shiga (JP); Naoki Shimoyama, Shiga (JP); Daisuke Izuhara, Kyoto (JP); Shunji Kono, Shiga (JP); Masayuki Kidai, Shiga (JP)

(73) Assignee: TORAY Industries, Inc., Tokyo (JP)

( * ) Notice: Subject to any disclaimer, the term of this patent is extended or adjusted under 35 U.S.C. 154(b) by 1187 days.

(21) Appl. No.: 10/562,110

(22) PCT Filed: Jun. 25, 2003

(86) PCT No.: PCT/JP03/08032
§ 371 (c)(1),
(2), (4) Date: Feb. 1, 2007

(87) PCT Pub. No.: WO2005/001969
PCT Pub. Date: Jan. 6, 2005

(65) Prior Publication Data
US 2007/0134530 A1  Jun. 14, 2007

(51) Int. Cl.
*H01M 8/10* (2006.01)

(52) U.S. Cl.
USPC ............ 429/309; 429/491; 429/492; 429/493

(58) Field of Classification Search
USPC .................................. 429/309, 491, 492, 493
See application file for complete search history.

(56) References Cited

U.S. PATENT DOCUMENTS

| | | | |
|---|---|---|---|
| 5,013,765 A | 5/1991 | Sluma et al. | |
| 5,403,675 A | 4/1995 | Ogata et al. | |
| 5,741,408 A | 4/1998 | Helmer-Metzmann et al. | |
| 5,834,566 A | 11/1998 | Helmer-Metzmann et al. | |
| 6,103,414 A | 8/2000 | Cabasso et al. | |
| 6,365,294 B1 | 4/2002 | Pintauro et al. | |
| 6,413,676 B1 | 7/2002 | Munshi | |
| 6,444,343 B1 | 9/2002 | Prakash et al. | |
| 6,447,943 B1 | 9/2002 | Peled et al. | |
| 6,645,675 B1 | 11/2003 | Munshi | |
| 6,723,757 B1 | 4/2004 | Kerres et al. | |
| 6,759,441 B1 | 7/2004 | Kerres et al. | |
| 6,773,844 B2 | 8/2004 | Nakano et al. | |
| 6,777,116 B1 * | 8/2004 | Muller et al. ................. | 429/410 |
| 6,794,480 B2 | 9/2004 | Goto et al. | |
| 6,828,353 B1 | 12/2004 | Charnock et al. | |
| 7,713,449 B2 | 5/2010 | Adachi et al. | |
| 2002/0045085 A1 | 4/2002 | Formato et al. | |
| 2002/0091225 A1 | 7/2002 | McGrath et al. | |
| 2002/0191225 A1 | 12/2002 | Stringham | |
| 2006/0180796 A1 | 8/2006 | Adachi et al. | |
| 2008/0075999 A1 | 3/2008 | Izuhara et al. | |

FOREIGN PATENT DOCUMENTS

| | | |
|---|---|---|
| CA | 2324963 | 10/1999 |
| CA | 2325020 | 10/1999 |
| EP | 0 224 020 | 6/1987 |
| EP | 0 688 824 | 12/1995 |
| JP | 53-26777 | 3/1978 |
| JP | 56-34329 | 8/1981 |
| JP | 64-22932 | 1/1989 |
| JP | 2-208322 A | 8/1990 |
| JP | 5-271460 | 10/1993 |
| JP | 8-180891 | 7/1996 |
| JP | 10-340732 | 12/1998 |
| JP | 2001-504636 | 4/2001 |
| JP | 2001-192531 A | 7/2001 |
| JP | 2001-294705 | 10/2001 |
| JP | 2001-294706 | 10/2001 |
| JP | 2002-110200 | 4/2002 |
| JP | 2002-226575 | 8/2002 |
| JP | 2002-524631 | 8/2002 |
| JP | 2002-260687 | 9/2002 |
| JP | 2002-293889 | 10/2002 |
| JP | 2002-324559 | 11/2002 |
| JP | 2003-012835 | 1/2003 |
| JP | 2003-217342 | 7/2003 |
| JP | 2003-217343 | 7/2003 |
| JP | 2003-217365 | 7/2003 |
| JP | 2004-247252 | 9/2004 |
| JP | 2005-019055 | 1/2005 |

(Continued)

OTHER PUBLICATIONS

Walker, M. et al. (1999). "Proton-Conducting Polymers with Reduced Methanol Permeation," *Journal of Applied Polymer Science*. 74:67-73.

Kerres, Jochen et al. (1999). "Synthesis and Characterization of Novel Acid-base Polymer Blends for Application in Membrane Fuel Cells," *Solid State Ionics*. 125:243-249.

Kawahara, M. et al. (2000). "Relationship Between Absorbed Water and Proton Conductivity in Sulfpropylated Poly (Benzimidazole)," *Polymers for Advanced Technologies*. 11:544-547.

Kreuer, K. D. (2001). "On the Development of Proton Conducting Polymer Membranes for Hydrogen and Methanol Fuel Cells," *Journal of Membrane Science*. 185:29-39.

Rikukawa, M. et al. (2000). "Proton-Conducting Polymer Electrolyte Membranes Based on Hydrocarbon Polymers," *Progress in Polymer Science*. 25:1463-1502.

(Continued)

*Primary Examiner* — Patrick Ryan
*Assistant Examiner* — Ladan Mohaddes
(74) *Attorney, Agent, or Firm* — Morrison & Foerster LLP

(57) ABSTRACT

The present invention relates to a polymer electrolyte that provides high proton conductivity and low fuel crossover at the same time, as well as a member using the same. The embodiments of the invention can achieve high output and high energy density in the form of a polymer electrolyte fuel cell. A polymer electrolyte comprising a proton conductive polymer (A) and a polymer (B) which is different from (A) wherein a ratio of the amount of unfreezable water, represented by formula (S1), in said polymer electrolyte is no less than 40 wt % and no greater than 100 wt % is disclosed. The ratio of amount of unfreezable water (S1)=(amount of unfreezable water)/(amount of low melting point water+ amount of unfreezable water)×100 (%).

15 Claims, 4 Drawing Sheets

FOREIGN PATENT DOCUMENTS

| JP | 2005-174897 | 6/2005 |
|---|---|---|
| WO | WO-97/24777 | 7/1997 |
| WO | WO-98/22989 | 5/1998 |
| WO | WO-00/15691 | 3/2000 |
| WO | WO-01/01507 | 1/2001 |
| WO | WO-01/17051 | 3/2001 |
| WO | WO-01/19896 | 3/2001 |
| WO | WO-03/095509 | 11/2003 |
| WO | WO-2004/036679 | 4/2004 |

OTHER PUBLICATIONS

Kerres, J.A. (2001). "Development of Ionomer Membranes for Fuel Cells," *Journal of Membrane Science*. 185:3-27.

Supplementary EP Search Report dated Mar. 30, 2010 directed to counterpart application No. EP 03817295.

Bailly, C. et al. (1987). "The Sodium Salts of Sulphonated Poly(aryl-ether-etherketone) (PEEK): Preparation and Characterization." *Polymer* 28: 1009-1016.

Nolte, R. et al. (1993). "Partially Sulfonated Poly(arylened ether sulfone)—A Versatile Proton Conducting Membrane Material for Modern Energy Conversion Technologies." *Journal of Membrane Science*. 83: 211-220.

Tang, H. et al. (1999). "Polyphosphazene Membranes. III. Solid-State Characterization and Properties of Sulfonated Poly[bis(3-methylphenoxy) phosphazene]" *Journal of Applied Polymer Science* 71: 387-399.

Ishikiriyama K. et al. (1995). "Pore Size Distribution (PSD) Measurements of Silica Gels by Means of Differential Scanning Calorimetry." *Journal of Colloid and Interface Science* 171:92-102.

Smith, C.D. et al. (1991). "Unique Characteristics Derived From Poly( Arylene Ether Phosphine Oxide)s," High Performance Polymers vol. 3(4):211-229.

Wang, F et al.(2000). "Synthesis of Sulfonated Poly (Arylene Ether Sulfone)S Via Direct Polymerization," *Polymer Preprints* vol. 41(1):237-238.

Greenley, R. (1999). "Q and e Values for Free Radical Copolymerizations of Vinyl Monomers and Telogens." Chapter II in *Polymer Handbook*. John Wiley & Sons, Inc. pp. 309-319.

Takenaka, H. et al. (1985). "Studies on Solid Polymer Electrolyte Water Electrolysis II, Preparation Methods for Membrane-Electrocatalyst Composite." *Denki Kagaku* 53(4): 261.

Ticianelli, E. A. et al. (1988). "Method to Advance Technology of Proton Exchange Membrane Fuel Cells." *Mass Transfer* 135 (9): 2209-2214.

Hatanaka, T. (2002). "Direct Methanol Fuel Cell." R & D Review of Toyota CRDL, 37(1):59-64 (English language translation of abstract).

Lafitte, B. et al.(2002). "Sulfophenylation of Polysulfones for Proton-Conducting Fuel Cell Membranes." *Macromolecular Rapid Communications*. 23(15):896-900.

Adachi, U.S Office Action mailed on Jan. 27, 2009 directed at related U.S. Appl. No. 10/548,110; 9 pages.

Adachi, S. et al. U.S. Office Action mailed Aug. 4, 2009, directed to a related U.S. Appl. No. 10/548,110; 12 pages.

Izuhara, D. U.S. Office Action mailed Dec. 9, 2010 directed to a related U.S. Appl. No. 11/661,423; 12 pages.

International Search Report mailed on Jun. 29, 2004, directed to International Patent Application No. PCT/JP2004/002894; 8 pages.

International Preliminary Report on Patentability and Written Opinion mailed Feb. 13, 2006, directed to International Patent Application No. PCT/JP2004/002894; 14 pages.

International Search Report mailed on Dec. 6, 2005, directed to International Patent Application No. PCT/JP2005/015703; 4 pages.

International Preliminary Report on Patentability and Written Opinion mailed Mar. 20, 2007, directed to International Patent Application No. PCT/JP2005/015703; 7 pages.

Izuhara, D. et al., U.S. Office Action mailed May 25, 2011, directed to U.S. Appl. No. 11/661,423; 13 pages.

Lee, William et al. (1996). "Proton Transport Through Polyethylene-Tetrafluoroethylene-Copolymer-Based Membrane Containing Sulfonic Acid Group Prepared by RIGP," *J Electrochem. Soc.* 143(9):2795-2799.

Depre, Laurent et al. (2000). "Proton Conducting Sulfon/Sulfonamide Functionalized Materials Based on Inorganic-Organic Matrices," *Electrochemical Acta* 45:1377-1383.

Wang, Feng et al. (2002). "Direct Polymerization of Sulfonated Poly(arylene ether sulfone) Random (Statistical) Copolymers: Candidates for New Proton Exchange Membranes," *Journal of Membrane Science* 197:231-242.

Wang, Huanting et al. (2002) "Nafion-Bifunctional Silica Composite Proton Conductive Membranes," *Journal of Materials Chemistry* 12:834-837.

Yanagimachi, Satomi et al. (2002) "Synthesis of Phosphonated Poly (4-phenoxybenzoyl-1, 4-phenylene (1))," *Polymer Preprints, Japan* 51(4):750 (with English translation attached).

Young, S.K. et al. "Nafion®/ORMOSIL Nanocomposites via Polymer-in Situ Sol-Gel Reactions. 1. Probe of ORMOSIL Phase Nanostructures by $^{29}$ Si Solid-State NMR Spectroscopy," *Polymer* 43: 2311-2320 (2002).

\* cited by examiner

POLYMER ELECTROLYTE AS WELL AS POLYMER ELECTROLYTE MEMBRANE, MEMBRANE ELECTRODE ASSEMBLY AND POLYMER ELECTROLYTE FUEL CELL USING THE SAME

REFERENCE TO RELATED APPLICATION

This application is a national stage of PCT/JP2003/08032 which was published on Jan. 1, 2005.

TECHNICAL FIELD

The present invention relates to a polymer electrolyte, as well-as a polymer electrolyte membrane, a membrane electrode assembly and a polymer electrolyte fuel cell using the same.

BACKGROUND ART

Fuel cells are power generating units which have little exhaust and high energy efficiency, imposing little burden on the environment. Therefore, fuel cells are again being focused on, as global environmental protection has come highly, into value in recent years. Fuel cells are power generating units which hold high expectations for the future as power generating units in dispersion type power generation facilities of a relatively small scale, and of moveable bodies such as automobiles and ships. In addition, fuel cells are being focused on as power sources for compact mobile apparatuses and portable apparatuses, and are expected to be mounted inside cellular phones and personal computers instead of secondary batteries such as nickel hydrogen batteries and lithium ion batteries.

As for polymer electrolyte fuel cells, direct type fuel cells where fuel, such as methanol, is directly supplied, are being focused on, in addition to conventional polymer electrolyte fuel cells (hereinafter in some cases referred to as PEFC's), Where a hydrogen gas is used as fuel. Though direct type fuel cells have power that is lower than that of conventional PEFC's, the fuel is liquid, and no reformer is used, and therefore, there are advantages such that the energy density becomes high and the time for use of a cellular apparatus at full charge is long.

In a conventional polymer electrolyte fuel cell, anode and cathode electrodes where reactions for power generation occur, and a polymer electrolyte membrane that becomes a proton conductor between the anode and the cathode form a membrane electrode assembly (MEA), and this MEA forms a cell that is placed between separators as a unit. Here, the electrodes are formed of an electrode base for accelerating gas diffusion and collecting (supplying) electricity (also referred to as gas diffusing electrode or electricity collector), and an electrode catalyst layer that becomes an actual field for electrochemical reaction. In the anode electrode of a PEFC, for example, fuel, such as a hydrogen gas, generates protons and electrons through reaction in the catalyst layer of the anode electrode, where electrons are conducted to the electrode base and protons are conducted to the polymer electrolyte. Therefore, the anode electrode is required to have excellent gas diffusing properties, electron conductivity and proton conductivity. Meanwhile, in the cathode electrode, an oxidizing gas, such as oxygen or air, reacts, in the catalyst layer of the cathode electrode, with protons that have been conducted from the polymer electrolyte and electrons that have been conducted from the electrode base, so as to generate water. Therefore, in the cathode electrode, it also becomes necessary to efficiently discharge water that has been generated, in addition to gaining gas diffusing properties, electron conductivity and proton conductivity.

In addition, a direct type fuel cell where methanol is used as fuel from among PEFC's requires performance that is different from that of conventional PEFC's where a hydrogen gas is used as fuel. That is to say, in the anode electrode of a direct type fuel cell, fuel such as a methanol solution reacts in the catalyst layer of the anode electrode so as to generate protons, electrons and carbon dioxide, and conduct electrons to the electrode base, protons to the polymer electrolytes and release carbon dioxide to the outside of the system through the electrode base. Therefore, permeability of fuel such as a methanol solution and discharging properties of carbon dioxide are required, in addition to the properties that are required for the anode electrode of conventional PEFC's. Furthermore, in the cathode electrode of a direct type fuel cell, in addition to a reaction that is the same as that of conventional PEFC's, a reaction occurs, where fuel, such as methanol that has passed through the electrolyte membrane, and an oxidizing gas, such as oxygen or air, generate carbon dioxide and water in the catalyst layer of the cathode electrode. Therefore, the amount of water that is generated becomes greater than in conventional PEFC's, and it becomes necessary to discharge water more efficiently.

Conventional perfluorinated proton conductive polymers, such as Nafion (made by DuPont, trademark), have been utilized as polymer electrolytes. However, these perfluorinated proton conductive polymers have problems, such that formation of fuel, such as methanol, is great, and battery output and energy efficiency are not sufficient. In addition, the cost of perfluorinated proton conductive polymers is very high, because fluorine is used.

A variety of polymer electrolytes where an anionic group has been introduced into for example, a non-perfluorinated proton conductive polymer that is different from conventional perfluorinated proton conductive polymers have been proposed (US Unexamined, Patent Publication 2002/91225, U.S. Pat. No. 5,403,675, J. Membrane Sci., Vol. 197, 231-242 (2002)). When the introduced amount of an anion base is increased in order to gain high conductivity, however, these polymer electrolytes easily absorb water, and thus form a large water cluster in the polymer electrolyte, and the content of a low melting point water that is defined in the present specification is high, and therefore, the ratio of the amount of unfreezable water that is defined in the present specification is low, and there is a defect, such that fuel crossover, such as of methanol, is large. It is presumed that this is because fuel such as methanol easily penetrates through low melting point water.

In addition, a composition of a proton conductive polymer and another polymer has been proposed. A composite membrane made of sulfonated polyphenylene oxide and polyvinylidene fluoride (U.S. Pat. No. 6,103,414), for example, is known. In addition, a composite membrane made of sulfonated polystyrene and polyvinylidene fluoride (Published Japanese Translation of International Publication No. 2001-504636) is also known. The polymer electrolyte membranes which are described in these documents, however, are blend membranes of an ion conductive polymer and polyvinylidene fluoride, have poor compatibility and easily gain a large phase separated structure in the order of μm, where low melting point water or bulk water (defined in the present specification) exists between the phases, and therefore, the ratio of the amount of unfreezable water in the electrolyte is low, and it is difficult to achieve a high conductivity and suppression of fuel crossover at the same time. In addition, an assembly made of a proton conductive polymer and a copolymer of siloxane having a nitrogen atom containing group and a metal oxide (Unexamined Published Japanese Patent Application No. 2002-110200) is known. Though membranes made of an assembly of Nafion and siloxane (Polymers, Vol. 43, 2311-2320 (2002), J. Mater. Chem., Vol. 12, 834-837 (2002)) and the like are also known, the membranes described in these documents use Nafion, which is a perfluorinated proton conductive polymer, and therefore, it is difficult to achieve high proton conductivity and low fuel crossover at the same time, even when combined with another polymer.

DISCLOSURE OF THE INVENTION

A polymer electrolyte of the present invention is a polymer electrolyte where a proton conductive polymer (A) and a polymer (B) which is different from (A) are mixed, and is characterized in that the ratio of the amount of unfreezable water, represented by formula (S1), in the above described polymer electrolyte is no less than 40 wt % and no greater than 100 wt %.

(ratio of amount of unfreezable water)=(amount of unfreezable water)/(amount of low melting point water+amount of unfreezable water)×100(%) (S1)

The present inventors found that a polymer electrolyte where proton conductive polymer (A) and polymer (B) that is different from (A) are mixed is effective for achieving high conductivity and suppression of fuel crossover at the same time, and that the performance of the above described polymer electrolyte is influenced by the state of existence of water that is included in the polymer electrolyte and by the amount thereof, and thus, achieved the present invention.

In the present specification, water in the polymer electrolyte is classified into bulk water, where the melting point is observed at a temperature of no less than 0° C., low melting point water, where the melting point is observed at a temperature of no higher than 0° C. and no lower than −30° C., and unfreezable water, where the melting point is not observed at a temperature of no lower than −30° C. As a result of diligent research, the present inventors found that the ratio of unfreezable water significantly affects the performance of the polymer electrolyte.

It is necessary in a polymer electrolyte of the present invention for the ratio of the amount of unfreezable water, represented by formula (S1), to be no higher than 40 wt % and no lower than 100 wt %, it is more preferable for it to be no less than 50 wt % and no higher than 99.9 wt %, and it is most preferable for it to be no less than 60 wt % and no higher than 99.9 wt %.

(ratio of amount of unfreezable water)=(amount of unfreezable water)/(amount of low melting point water+amount of unfreezable water)×100(%) (S1)

Here, the amount of unfreezable water and the amount of low melting point water have the values that have been measured in accordance with the below described method.

It is considered that fuel such as methanol permeates primarily through low melting point water, and fuel crossover becomes great when the ratio thereof is large. Meanwhile, it is presumed that unfreezable water exists in the proximity of ion groups and polarized groups, and it is presumed that fuel such as methanol does not easily permeate through this unfreezable water. By implementing a polymer electrolyte of which the content of such unfreezable water is large, high proton conductivity and low fuel crossover can be achieved at the same time, and it becomes possible to achieve high output and high energy capacity in a polymer electrolyte fuel cell.

In the case where the ratio of the amount of unfreezable water is less than 40 wt %, proton conductivity or the effects of suppression of fuel crossover become insufficient, which is not preferable. Though it is preferable for the ratio of the amount of unfreezable water to be as close to 100 wt % as possible, there is the risk of conductivity being lowered in the case where no low melting point water is included, and it is preferable for the upper limit to be approximately 99.9%.

Furthermore, it is preferable for the ratio (content of unfreezable water) of the amount of unfreezable water in the polymer electrolyte to the weight of the polymer electrolyte when dried, which is represented by formula (S2), to be no less than 20% and no higher than 200%.

(content of unfreezable water)=(amount of unfreezable water in polymer electrode)/(weight of polymer electrolyte, when dried)×100(%) (S2)

Here, the amount of unfreezable water in the polymer electrolyte and the weight of the polymer electrolyte when dried have the values that have been measured in accordance with the below described method.

In the case where the content of unfreezable water is less than 20%, proton conductivity becomes insufficient, and in the case where the content of unfreezable water exceeds 200%, the effects of suppressing fuel crossover tend to be lowered. It is more preferable for the content of unfreezable water to be no less than 25% and no higher than 150%, and it is more preferable for it to be no less than 30% and no higher than 100%.

The ratio of the amount of unfreezable water, represented by formula (S1) and the content of unfreezable water, represented by formula (S2), are found in accordance with a differential scanning calorimetry analysis (DSC) method. That is to say, a polymer electrolyte is immersed in water at 20° C. for 12 hours, and after that, taken out from the water, and excessive water that clings to the surface is removed by drying the surface with gauze as quickly as possible, and then, the polymer electrolyte is placed in a sealable type sample container made of aluminum with an alumina coating, of which the weight (Gp) has been measured in advance, which is then clamped shut, and after that, the total weight (Gw) of the sample and the sealable type sample container are measured as quickly as possible, and DSC measurement is immediately carried out. In accordance with the temperature measuring program, the polymer electrolyte is cooled from room temperature to −30° C. at a rate of 10° C./minute, and after that, the temperature is increased to 5° C. at a rate of 0.3° C./minute, and the amount of bulk water Wf is found from the DSC curve of this temperature raising process using the following formula (n1), the amount of low melting point water Wfc is found using formula (n2), and these are then subtracted from the total content of water, and thereby, the amount of unfreezable water Wnf is found [formula (n3)].

$$W_f = \int_{T_0}^{>T_0} \frac{\frac{dq}{dt}}{m\Delta H_0} dt \quad (n1)$$

$$W_{fC} = \int_{<T_0}^{T_0} \frac{\frac{dq}{dt}}{m\Delta H(T)} dt \quad (n2)$$

$$W_{nf} = W_t - W_f - W_{fC} \quad (n3)$$

Here, Wf, Wfc, Wnf and Wt are the weight of water per weight unit of a dried sample, m is the weight of the dried sample, dq/dt is the heat flux signal of the DSC, ΔH0 is the melting enthalpy at T0, and T0 is the melting point of bulk water. Here, a small hole is created in the sealable type sample container after the DSC measurement, and the inside is vacuum dried for 24 hours at 110° C. in a vacuum drier, and after that, the total weight (Gd) of the sample and the sealable type sample container is measured as soon as possible. The weight of the dried sample (m) is m=Gd−Gp. The total content of water (Wt) is Wt=(Gw−Gd)/m.

The apparatuses and the conditions for the DSC measurement are as follows.

DSC apparatus: "DSC Q100," made by TA Instruments Corporation Data processing apparatus: "TRC-THADAP-DSC," made by Toray Research Center Inc.

Temperature range for measurement: −50° C. to 5° C.
Rate of scanning: 0.3° C./minute
Amount of sample: approximately 5 mg
Sample pan: sealable type sample container made of aluminum
Correction of temperature/calorie: melting point of water (0.0° C., calorie for melting: 79.7 cal/g)

Here, the present measuring method has been developed by Toray Research Center Inc., and the measured values by Toray Research Inc. are the most reliable. Measured values by other institutions are, in some cases, not so reliable as to be usable as values which are appropriate for implementing the present invention, and therefore, the present invention should be implemented on the basis of the values measured by Toray Research Center Inc.

In the case where a conventional proton conductive polymer is used for the polymer electrolyte, the content of water in the polymer electrolyte increases in such a manner that low melting point water and bulk water increases in the polymer electrode, increasing fuel crossover, when the amount of anionic group is increased in order to gain high proton conductivity, and therefore, high proton conductivity and suppression of fuel crossover cannot be achieved at the same time. In contrast to this, the polymer electrolyte of the present invention is a polymer electrolyte where proton conductive polymer (A) and polymer (B) that is different from (A) are mixed, and polymer (B) constrains the molecular chains of proton conductive polymer (A), and thereby, the amount of low melting point water and bulk water is suppressed, increasing the ratio of unfreezable water, and thus, it can be conceived that high proton conductivity and low fuel crossover can be achieved at the same time.

Next, proton conductive polymer (A) is described. Proton conductive polymer (A) may be a perfluorinated proton conductive polymer or a non-perfluorinated proton conductive polymer.

Perfluorinated proton conductive polymer means proton conductive polymers where most or all of the hydrogen in alkyl groups and/or alkylene groups in the polymer is replaced with fluorine atoms. In the present specification, perfluorinated proton conductive polymers are defined as proton conductive polymers where 85% or more of the hydrogen in the alkyl groups and/or alkylene groups in the polymer is replaced with fluorine atoms. Goods on the market, such as Nafion (made by Dupont), Flemion (made by Asahi Glass Co., Ltd.) and Aciplex (made by Asahi Kasei Corporation) can be cited as examples of typical perfluorinated proton conductive polymers. The structure of these perfluorinated proton conductive polymers can be represented by formula (1).

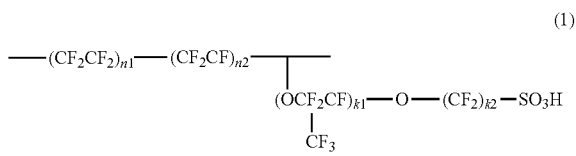

[In formula (1), $n_1$ and $n_2$ indicate independent natural numbers. $k_1$ and $k_2$ indicate independent integers from 0 to 5.]

In perfluorinated proton conductive polymers, hydrophobic portions and hydrophilic portions form a clear phase separated structure, and therefore, water channels, referred to as clusters, are formed in the polymers. It is believed that these water channels are primarily formed of low melting point water, and fuel, such as methanol, moves easily through these, which is not necessarily appropriate for suppressing fuel crossover. Accordingly, it is more preferable to use a non-perfluorinated proton conductive polymer according to the present invention. It becomes easier to achieve high proton conductivity and low fuel crossover at the same time by using a non-perfluorinated proton conductive polymer. Here, non-perfluorinated proton conductive polymers indicate proton conductive polymers other than perfluorinated proton conductive polymers.

Non-perfluorinated proton conductive polymers are further described.

A number of types of non-perfluorinated proton conductive polymer may be utilized at the same time.

It is preferable for non-perfluorinated proton conductive polymers to be polymers having an anionic group. An anionic group is a substituent group which can generate an anion and a proton (cation in the case of a salt) by dissociating under the existence of water. As such an anionic group, a sulfonic acid group, a sulfone imide group, a sulfuric acid group, a phosphonic acid group, a phosphoric acid group and a carboxylic acid group are preferably used. Here, sulfonic acid group means a group that can be represented by formula (f1), sulfone imide group means a group that can be represented by formula (f2) [in the formula, R represents an arbitrary atomic group], sulfuric acid group means a group that can be represented by formula (f3), phosphonic group acid group means a group that can be represented by formula (f4), phosphoric group means a group that can be represented by formula (f5) or (f6), and carboxylic acid group means a group that can be represented by formula (f7). In addition, in the case where salts of these are used, the polymer corresponds to one having an anionic group.

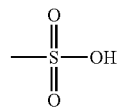

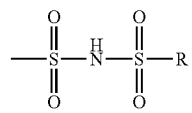

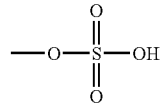

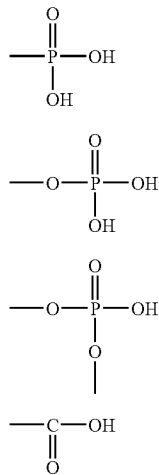

It is more preferable, from the point of view of high proton conductivity, for the polymer to have at least one type from among a sulfonic acid group, a sulfone imide group and a sulfuric acid group, from among these anionic groups, and it is most preferable, from the point of view of resistance to hydrolysis, to have a sulfonic acid group or sulfone imide group. Two or more types from among these anionic groups can be included in the above described non-perfluorinated proton conductive polymer.

Preferable non-perfluorinated proton conductive polymers having such an anionic group are concretely described by citing examples below (E-1 and E-2).

(E-1) Polymers gained from a vinyl polymerizing monomer, for example, polymers gained from a vinyl polymerizing polymer having an anionic group, such as acrylic acid, methacrylic acid, vinyl benzoate, vinyl sulfonate, allyl sulfonate, styrene sulfonate, maleic acid, 2-acryl amide-2-methyl propane sulfonate, sulfo-propyl (meth)acrylate and ethylene glycol methacrylate phosphate can be cited. Polymers where such a vinyl polymerizing monomer having an anionic group and a monomer having no anionic group are copolymerized are also appropriate. Any monomer having no anionic group can be used without any particular limitation, as long as it is a compound having a vinyl polymerizing functional group. Methacrylate based compounds, such as methyl (meth)acrylate, ethyl (meth)acrylate, propyl (meth)acrylate, butyl (meth)acrylate, (2-ethyl) hexyl (meth)acrylate, dodecyl (meth)acrylate, benzyl (meth)acrylate and 2-hydroxy ethyl (meth)acrylate, styrene based compounds, such as styrene, α-methyl styrene, amino styrene and chloromethyl styrene, (meth)acryl amide based compounds, such as (meth)acrylonitrile, (meth)acryl amide, N,N-dimethylacryl amide, N-acryloylmorpholine and N-methyl acryl amide, and maleimide based compounds, such as N-phenyl maleimide, N-benzyl maleimide, N-cyclohexyl maleimide and N-isopropyl maleimide can be preferably cited.

In addition, polymers which are gained from vinyl polymerizing monomers which do not have an anionic group, and into which an anionic group is introduced, are also appropriate. A known method can be applied as the method for introducing an anionic group, and for example, the introduction of a phosphonic acid group becomes possible in accordance with a method that is described in, for example, Polymer Preprints, Japan, 51, 750 (2002) or the like. The introduction of a phosphoric acid group becomes possible through conversion into a phosphoric ester of a polymer having, for example a hydroxyl group. The introduction of a carboxylic acid group becomes possible by oxidizing a polymer having, for example, an alkyl group or a hydroxy alkyl group. The introduction of a sulfuric acid group becomes possible through conversion into a sulfuric ester of a polymer having, for example, a hydroxyl group. As for the method for introducing a sulfonic acid group, the methods which are described in, for example, Unexamined Published Japanese Patent Application No. Hei2-(1990)-16126 and Unexamined Published Japanese Patent Application No. Hei2 (1990)-208322 are known. Concretely, a polymer can, for example, be made to react with a sulfonating agent, such as a chlorosulfonic acid, in a hydrocarbon halide based solvent, such as chloroform, or can be sulfonated through reaction in concentrated sulfuric acid or in a fuming sulfuric acid. The sulfonating agent is not particularly limited, as long as it can sulfonate a polymer, and sulfur trioxide and the like can be utilized in addition to the above. In addition, in the case of a polymer having an epoxy group, for example, a polymer can be sulfonated in accordance with the method that is described in J. Electrochem. Soc., Vol. 143, No. 9, 2795-2799 (1996). In the case where a polymer is sulfonated in accordance with any of these methods, the degree of sulfonation can be easily controlled by adjusting the used amount of the sulfonating agent, the temperature for reaction and the time for reaction. The introduction of a sulfone imide group into an aromatic based polymer becomes possible in accordance with, for example, a method for making a sulfonic acid group react with a sulfone amide group.

In the case where the proton conductive polymer is a cross linking polymer, it is advantageous for suppressing fuel crossover. In the case where a polymer that is gained from a vinyl polymerizing polymer is cross linked, a vinyl polymerization monomer having a number of polymerizing, functional groups may be copolymerized as a cross linking agent. (Meth)acrylate based compounds, such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, trimethylol propane tri(meth)acrylate, pentaerythritol tetra(meth)acrylate and dipentaerythritol poly (meth)acrylate, styrene based compounds, such as divinyl benzene, divinyl naphthalene and divinyl biphenyl, (meth)acryl amide based compounds, such as methylene bis(meth)acryl amide, and maleimide based compounds, such as phenylene bismaleimide and p, p'-oxybis (phenyl-N-maleimide) can be cited as examples of vinyl polymerizing monomers having a number of vinyl polymerizing functional groups.

In the case where a polymer that is gained from a vinyl polymerizing monomer is manufactured, a thermal polymerization initiator or an optical polymerization initiator, such as a peroxide based or azo based agent, is generally added to the monomer compound, in order to ease polymerization.

In the case of thermal polymerization, an initiator having optimal decomposing properties at a desired temperature for reaction is selected for use. In general, a peroxide based initiator where the temperature for making the half-life period 10 hours is 40° C. to 100° C. is generally appropriate, and a polymer electrode having still less cracks can be manufactured by using such an initiator.

A system where a carbonyl compound, such as benzophenone, and amine are used together, a mercaptan compound, a disulfide compound and the like can be cited as the optical polymerization initiator.

These polymerization initiators can be used alone or in combination, and an amount which is approximately 1 wt % or less can be used.

Known methods can be used as the polymerization method and the formation method. An inter-plate polymerization method and a method for polymerizing a monomer compound that have been converted into thin film form in accordance with a method such as coating in an inert gas or a reduced pressure atmosphere can be cited as an example.

Molding polymerization, which is one example, is described in the following. A space between two placoid molds is filled in with a monomer compound. Then, this is solidified into film form through optical polymerization or thermal polymerization. The placoid molds are fabricated from a resin, glass, ceramics, a metal or the like, and an optically transparent material is used in the case of optical polymerization, and usually, a resin or glass is utilized. The film may be made so as to have a certain thickness, and a gasket having a function of preventing liquid leakage of the monomer compound with which the space has been filled may be used together, if necessary. The placoid molds where the space is filled in with the monomer compound are subsequently irradiated with rays for activation, such as ultraviolet rays, or may be heated by being placed in an oven or a tank for a liquid for polymerization. A method using both types of polymerization, a method for polymerization through application of heat after optical polymerization, or conversely a method for optical polymerization after polymerization through application of heat, is also possible. In the case of optical polymerization, irradiation with light that includes a lot of ultraviolet rays from a light source such as a mercury lamp or an insect lamp for a short period of time (usually, no longer than 1 hour) is generally used. In the case of thermal polymerization, heating conditions where the temperature is gradually increased from approximately room temperature in such a manner that the temperature reaches 60° C. to 200° C. over a period of several hours or several tens of hours are preferable, in order to maintain uniformity and quality while enhancing reproducibility.

(E-2) Polymer Having Anionic group and Having Aromatic Ring in Main Chain

A polymer which has an aromatic ring in the main chain (hereinafter, in some cases, referred to as aromatic based polymer) and has an anionic group is cited.

Though the main chain structure is not particularly limited as long as it has an aromatic ring, it is preferable for it to have a sufficient physical strength to be used as, for example, an engineering plastic. Polyphenylene based polymers, which are described in U.S. Pat. No. 5,403,675, Unexamined Published Japanese Patent Application No. 2001-192531 and Unexamined Published Japanese Patent Application No. 2002-293889, for example, are preferable examples.

Furthermore, it is preferable for it to be a polymer having one or more types of polar groups which are different from the anionic group in at least the main chain. It is presumed that this is because high proton conductivity is provided and fuel crossover can be reduced by accelerating water coordination in the proximity of the main chain so as to increase the amount of unfreezable water.

Though the polar group is not particularly limited, a functional group where water can be coordinated is preferable. As for such a polar group, a sulfonyl group which is represented by formula (g1), an oxy group which is represented by formula (g2), a thio group which is represented by formula (g3), a carbonyl group which is represented by formula (g4), a phosphine oxide group which is represented by formula (g5) (in the formula, $R^1$ indicates a monovalent organic group), a phosphonate group which is represented by formula (g6) (in the formula, $R^2$ indicates a monovalent organic group), an ester group which is represented by formula (g7), an amide group which is represented by formula (g8) (in the formula, $R^3$ indicates a monovalent organic group), an imide group which is represented by formula (g9) and a phosphagen group which is represented by formula (g10) (in the formula, $R^4$ and $R^5$ indicate a monovalent organic group ) are preferable.

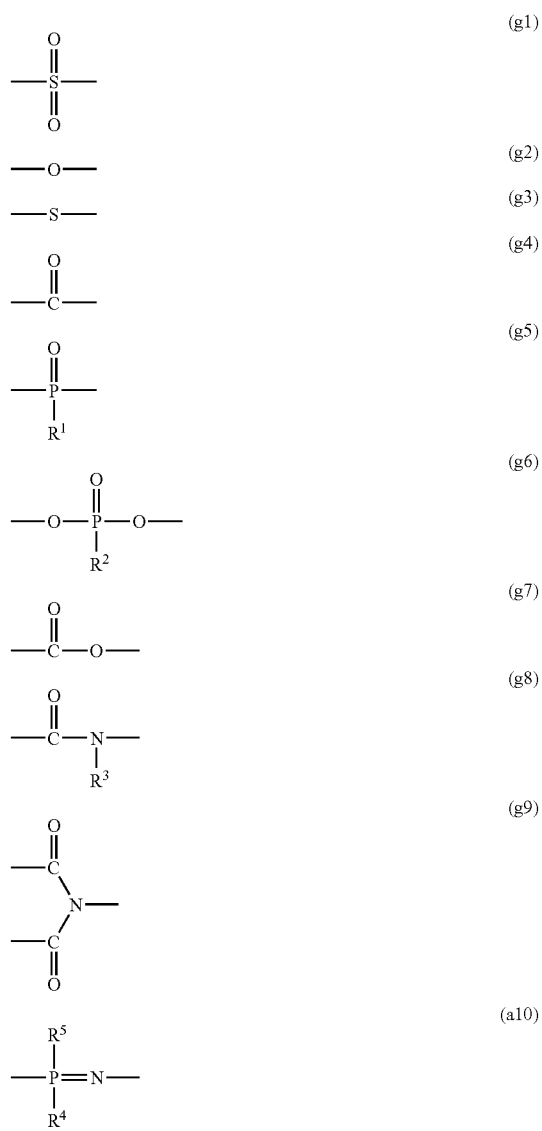

From among polymers having such a polar group, it is preferable for the polymer to be selected from aromatic based polymers having repeating units that are represented by the following formula (P1) (here, $Z^1$ and Z2 indicate an organic group that includes an aromatic ring and each of these may indicate two or more types of groups. $Y^1$ indicates an electron withdrawing group. $Y^2$ indicates O or S. a and b indicate independent integers from 0 to 2, where a and b are not zero simultaneously), and polyimides having repeating units that are represented by the following formula (P2) (here, $Z^3$ and $Z^4$ indicate an organic group that includes an aromatic ring and each of these may indicate two or more types of groups).

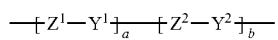 (P1)

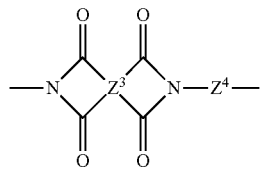 (P2)

Organic groups which are preferable as $Z^3$ are organic groups represented by formulas (Z3-1) to (Z3-4), and the most preferable one from the point of view of resistance to hydrolysis is the organic group represented by formula (Z3-1). Hydrogen in these aromatic rings may be replaced with a monovalent functional group such as an alkyl group, a cycloalkyl group, an aryl group, an alkyloxy group, an aryloxy group, a nitro group, a cyano group and an ester group.

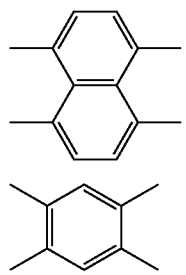

(Z3-1)

(Z3-2)

(Z3-3)

(Z3-4)

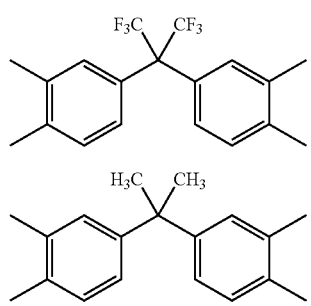

Organic groups which are preferable as $Z^4$ are organic groups represented by formulas (Z4-1) to (Z4-10). Hydrogen in these aromatic rings may be replaced with a monovalent functional group such as an alkyl group, a cycloalkyl group, an aryl group, an alkyl oxy group, an aryl oxy group, a nitro group, a cyano group and an ester group.

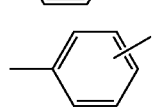

(Z4-1)

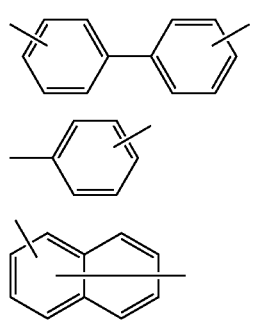

(Z4-2)

(Z4-3)

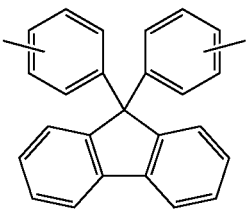 (Z4-4)

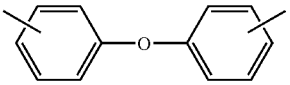 (Z4-5)

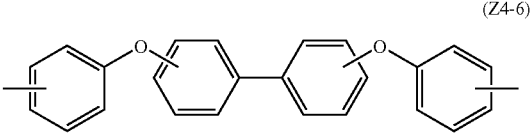 (Z4-6)

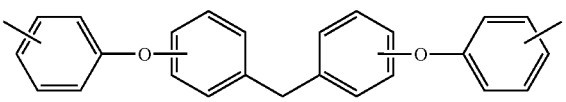 (Z4-7)

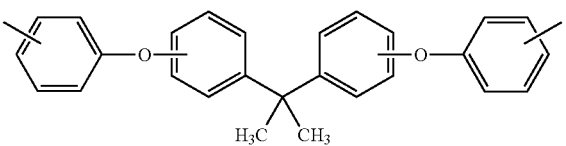 (Z4-8)

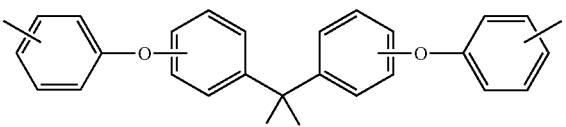 (Z4-9)

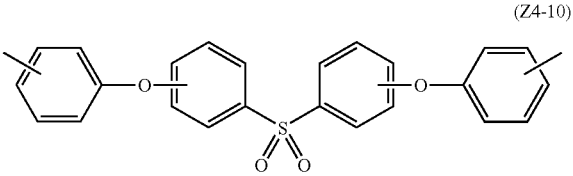 (Z4-10)

As for the polymer electrolyte, the aromatic based polymers having repeating units that are represented by formula (P1) are preferable from the point of view of excellent resistance to hydrolysis. From among the aromatic based polymers having repeating units that are represented by formula (P1), the aromatic based polymers having repeating units that are represented by formulas (P1-1) to (P1-9) ate particularly preferable. The aromatic based polymers having repeating units that are represented by formulas (P1-6) to (-P1-9) are most preferable from the points of view of proton conductivity being high and ease of manufacture.

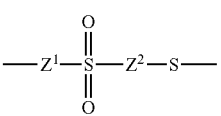 (P1-1)

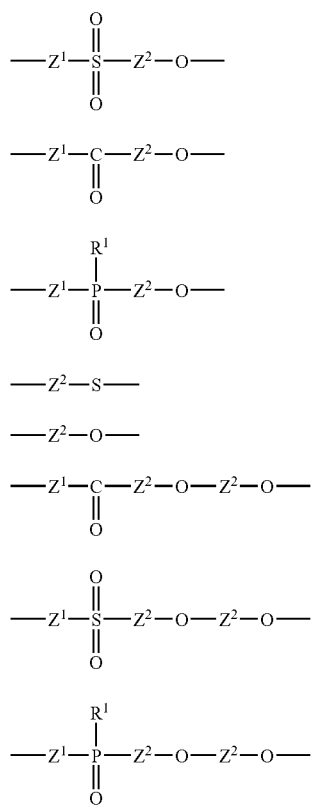

(P1-2)
(P1-3)
(P1-4)
(P1-5)
(P1-6)
(P1-7)
(P1-8)
(P1-9)

Here, organic groups which are preferable as $Z^1$ are a phenylene group and a naphthylene group These may have been replaced.

In addition, organic groups which are preferable as $Z^2$ are a phenylene group, a naphthylene group and organic groups which are represented by formulas (Z2-1) to (Z2-14). These may have been replaced. From among these, organic groups represented by formulas (Z2-7) to (Z2-14) are particularly preferable due to their excellence in the effects suppressing fuel permeation, and it is preferable for a polymer electrolyte of the present invention to contain, as $Z^2$, at least one type from among organic groups which are represented by formulas (Z2-7) to (Z2-14). The most preferable from among organic groups which are represented by formulas (Z2-7) to (Z2-14) is the organic group represented by formula (Z2-(8).

(Z2-1)
(Z2-2)
(Z2-3)

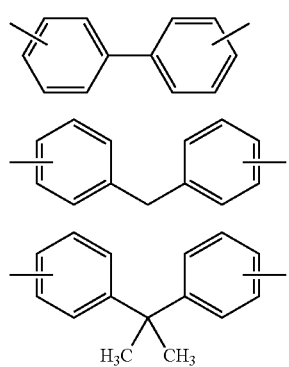

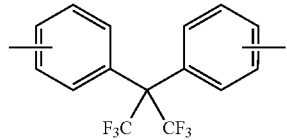

(Z2-4)

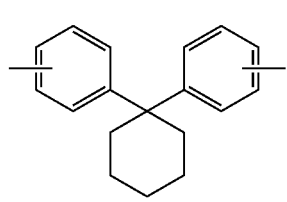

(Z2-5)

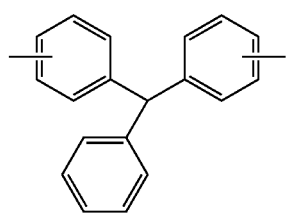

(Z2-6)

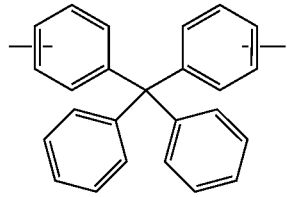

(Z2-7)

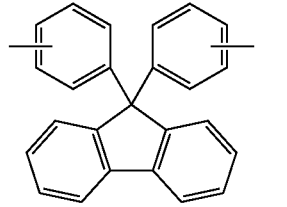

(Z2-8)

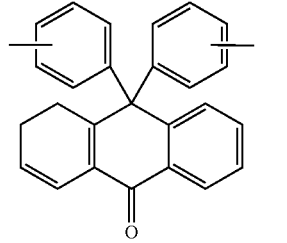

(Z2-9)

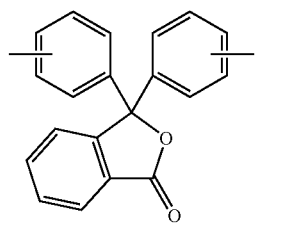

(Z2-10)

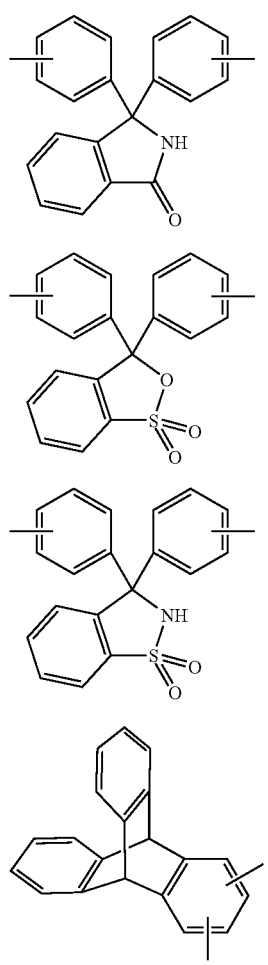

(Z2-11)

(Z2-12)

(Z2-13)

(Z2-14)

A methyl group, an ethyl group, a propyl group, an isopropyl group, a cyclopentyl group, a cyclohexyl group, a norbornyl group, a vinyl group, an allyl group, a benzyl group, a phenyl group, a naphthyl group, a phenylphenyl group and the like can be cited as preferable examples of the organic group that is represented by $R^1$ in formulas (P1-4) and (P1-9). The most preferable as $R^1$ is a phenyl group from the point of view of ease of industrial availability.

As for the method for introducing an anionic group into any of these aromatic based polymers, a method for polymerizing a monomer having an anionic group, a method for introducing an anionic group through polymer reaction and the like can be cited.

In accordance with the method for polymerizing a monomer having an anionic group, a monomer having an anionic group in repeating units may be used, and an appropriate protective group is introduced, if necessary, and this protective, group may be removed after polymerization. Such a method is described, for example, in Journal of Membrane Science, 197 (2002) 231-242.

When an example is cited in order to describe the method for introducing an anionic group through polymer reaction, the introduction of a phosphonic acid group into an aromatic based polymer is possible in accordance with a method that is described in, for example, Polymer Preprints, Japan, 51, 750 (2002). The introduction of a phosphate group into an aromatic based polymer is possible through conversion into phosphate of an aromatic based polymer having, for example, a hydroxyl group. The introduction of a carboxylic group into an aromatic based polymer is possible by oxidizing an aromatic based polymer having, for example, an alkyl group or a hydroxyalkyl group. The introduction of a sulfonyl group into an aromatic based polymer is possible through conversion into sulfate of an aromatic based polymer having, for example, a hydroxyl group. As for the method for converting an aromatic based polymer into sulfate, that is to say, the method for introducing a sulfonic acid group, methods that are described in, for example, Unexamined Published Japanese Patent Application No. Hei2 (1990)-16126 and Unexamined Published Japanese Patent Application No. Hei2 (1990)-208322. Concretely, an aromatic based polymer can be sulfonated by being made to react with a sulfonating agent such as chlorosulfonic acid in a solvent such as chloroform, or through reaction in concentrated sulfuric acid or fuming sulfuric acid. The sulfonating agent is not particularly limited as long as it sulfonates an aromatic based polymer, and sulfur trioxide and the like can be used in addition to the above. In the case where an aromatic based polymer is sulfonated in accordance with this method, the degree of sulfonation can be easily controlled by adjusting the used amount of the sulfonating agent, the temperature for reaction and the time for reaction. The introduction of a sulfone imide group into an aromatic based polymer is possible in accordance with, for example, a method for making a sulfone acid group react with a sulfonamide group.

The non-perfluorinated proton conductive polymer may be a cross linking polymer. In the case where the non-perfluorinated proton conductive polymer is a crosslinking polymer, it is advantageous for suppressing fuel crossover.

A polymer electrolyte of the present invention is a polymer electrolyte where proton conductive polymer (A) and polymer (B) that is different from (A) are mixed. In the present invention, "proton conductive polymer (A) and polymer (B) that is different from (A) are mixed" means that either (A) and (B) are substantially uniformly mixed or (A) and (B) are in a state where they are mixed without having a phase separated structure having a substantial size of no less than 100 82 m. The confirmation of whether or not (A) and (B) are substantially uniformly mixed or whether or not they are mixed without having a phase separated structure having a substantial size of no less than 100 μm is possible through the observation of the polymer electrolyte with an optical microscope. In the case where the polymer electrolyte is observed with an optical microscope and a phase separation cannot be confirmed, and in the case where 90 or more domain sizes of phase separations out of a randomly selected 100 are less than 100 μm, it is determined that (A) and (B) have been mixed with each other. The polymer electrolyte can be appropriately dyed in order to make the confirmation of a phase separated state easier in the observation with an optical microscope.

In the case where (A) and (B) have been mixed, it is believed that a state where the movement of molecular chains of (A) is restricted due to mutual effects vis-à-vis (B), that is to say, a state where the molecular chains of (A) are restricted, is achieved.

In a polymer electrolyte of the present invention, it is preferable for the above described proton conductive polymer (A) and the above described polymer (B) to be substantially uniformly mixed in order to suppress fuel crossover. The state where (A) and (B) are substantially uniformly mixed is a state where (A) and (B) are mixed without having a phase separated structure having a size of substantially no less than 1 μm. The confirmation of the substantially uniform mixture of (A) and (B) is possible through observation of the polymer electrolyte with an electron microscope. In the case where a cross section of the polymer electrolyte is observed with an electron microscope and phase separation cannot be confirmed, and in the case where 90 or more domain sizes of the phase separation out of a randomly selected 100 are less than 1 μm, it is determined that (A) and (B) have been substantially uniformly mixed with each other. The polymer electrolyte can be appropriately dyed in order to make the confirmation of a state of phase separation easier in the observation with an electron microscope.

It is believed in the state where (A) and (B) are substantially uniformly mixed that mutual polymer chains are sufficiently entangled with each other, where the mutual movements are restricted, preventing fuel permeation.

As for the method for creating the state where (A) and (B) are substantially uniformly mixed with each other, a method where (A) and (B) are mixed with each other in a state where at least either (A) or (B) is a precursor (monomer or oligomer), and after that, polymerization is carried out so as to fabricate a polymer electrolyte, is preferable.

Next, the above "polymer (B) that is different from (A)" is further described. This polymer (B) is effective in suppressing fuel permeation, and therefore, it is preferable for it to be insoluble in a 10 M methanol solution at 40° C. Being insoluble means that the amount of polymer (B) that is detected from the filtered solution that has been filtered with filter paper after the polymer electrolyte membrane has been immersed in a 10 M methanol solution at 40° C. for 8 hours is no greater than 5 wt % of the total amount of polymer (B) that is included in the polymer electrolyte membrane. Here, though the methanol solution is presumed as fuel, performance in a methanol solution is shared by other types of fuel and has generality.

Though inorganic cross linking polymers such as polyimide, polyamide, polyurethane, polyurea, a vinyl based polymer, a melamine based polymer, a phenol resin based polymer, organopolysiloxane, titania, zirconia and alumina can be cited as appropriate examples of polymer (B), the present invention is not limited to these. In addition, a number of types of polymers (B) may be used at the same time.

In addition, it is preferable to use a cross linking polymer as polymer (B). In this case, entanglement with molecular chains of the proton conductive polymer can be made more complex, exercising large effects of restricting molecular chains, and thus, it is particularly advantageous to achieve both high proton conductivity and low fuel crossover at the same time.

Cross linkage in the present invention may be a chemical cross linkage or a physical cross linkage. Cross linkage in the present invention means a state being substantially insoluble in a solvent or conversion to this state. In the present invention, a cross linking polymer means a polymer which is substantially insoluble in a solvent.

In addition, it is determined in the following manner whether or not a polymer electrolyte of the present invention includes a cross linking polymer. A polymer electrolyte (approximately 0.1 g) which is a test specimen is washed with pure water, and after that, is vacuumed dry for 24 hours at 40° C., and then, the weight is measured. The polymer electrolyte is immersed in a solvent which weighs 100 times greater, and the inside of a sealable container is stirred while being heated at 70° C. for 40 hours. Filtering is carried out using filter paper (No. 2) made by Advantec Corporation. The filter paper and the residue are washed during filtering with the same solvent that weighs 100 times greater so that the eluate is sufficiently eluted in the solvent. The filtered solution is exsiccated, and the weight of the eluate is found. In the case where the weight of the eluate is less than 95% of the initial weight, it is determined that this solvent includes a substantially insoluble component. This test is carried out for five types of solvents, toluene, hexane, N-methyl pyrrolidone, methanol and water, and in the case where it is determined that all the solvents include a substantially insoluble component, it is determined that this polymer electrolyte includes a cross linking polymer.

The polyimide that is used in the above described polymer (B) can be provided as a cross linking polymer by using an amine having three or more functional groups, or a carboxylic acid having six or more functional groups as the material.

The polyamide that is used in the above described polymer (B) can be provided as a cross linking polymer by using an amine having three or more functional groups, or a carboxylic acid having three or more functional groups as the material.

The polyurethane that is used in the above described polymer (B) can be provided as a cross linking polymer by using an isocyanate having three or more functional groups, or a polyol having three or more functional groups as the material.

The polyurea that is used in the above described polymer (B) can be provided as a cross linking polymer by using an isocyanate having three or more functional groups, or an amine having three or more functional groups as the material.

Copolymers including (meth)acrylate compounds, such as methyl (meth)acrylate, ethyl (meth)acrylate, propyl (meth)acrylate, butyl (meth)acrylate, 2-ethylhexyl (meth)acrylate, dodecyl (meth)acrylate, benzyl (meth)acrylate and 2-hydroxyethyl (meth)acrylate, styrene based compounds, such as styrene, α-methyl styrene, amino styrene and chloromethyl styrene, (meth)acryl amide based compounds, such as (meth)acrylonitrile, (meth)acryl amide, N,N-dimethyl acryl amide, N-acryloylmorpholine and N-methyl acryl amide, and maleimide based compounds, such as N-phenyl maleimide, N-benzyl maleimide, N-cyclohexyl maleimide and N-isopropyl maleimide can be preferably cited as the vinyl based polymer that is used for the above described polymer (B). These vinyl based polymers can be cross linked through copolymerization by using a cross linking agent which has a number of polymerizing functional groups from among vinyl based monomers. (Meth)acrylate based compounds, such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, trimethylol propane tri(meth)acrylate, pentaerythritol tetra(meth)acrylate and dipentaerythritol poly(meth)acrylate, styrene based compounds, such as divinyl benzene, divinyl naphthalene and divinyl biphenyl, (meth)acryl amide based compounds, such as methylene bis(meth) acryl amide, and maleimide based compounds, such as phenylene bismaleimide and p, p'-oxybis (phenyl-N-maleimide) can be cited as examples of vinyl polymerizing monomers having a number of vinyl polymerizing functional groups.

A bisphenol A type epoxy resin, a tetramethyl bisphenol A type epoxy resin, a tetrabromo bisphenol A type epoxy resin, a bisphenol F type epoxy resin, a tetramethyl bisphenol F type epoxy resin, a bisphenol S type epoxy resin, a tetramethyl bisphenol S type epoxy resin, a bisphenol AF type epoxy resin, a bisphenol Z type epoxy resin, a bisphenol fluorene type epoxy resin, a bisphenol type epoxy resin, a tetramethyl bisphenol type epoxy resin, a naphthalenediol type epoxy resin, a bisphenoxy ethanol fluorine type epoxy resin, a dicyclopentadiene type epoxy resin, a triphenol methane type epoxy resin, a tetraphenylol ethane type epoxy resin and the like can be cited as concrete examples of the epoxy based polymer that is used for the above described polymer (B). It is possible to use one or more types from among these at the same time.

Organopolysiloxane, which is one of the inorganic cross linking polymers that is used for the above described polymer (B), can be gained through condensation of a silane compound. A preferable silane compound as such is at least one type of compound that is selected from the group consisting of compounds which are represented by the below described general formula (d1) and compounds which are represented by the below described general formula (d2).

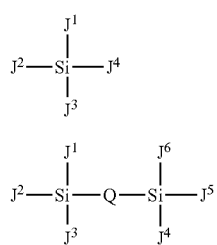

[In formulas (d1) and (d2), $J^1$ to $J^6$ represent independent substitute groups selected from alkyl, groups which may have been substituted, aryl groups which may have been substituted, hydroxy groups, alkoxy groups which may been substituted, aryloxy groups which may have been substituted, acyloxy groups which may have been substituted and halogen groups, and at least one of $J^1$ to $J^6$ represents a substitute group selected from a hydroxy group, an alkoxy groups which may have been substituted, an aryloxy group which may have been substituted, an acyloxy group which may have been substituted and a halogen group. Q represents a divalent organic group.]

In the formulas, $J^1$ to $J^6$ represent independent substitute groups selected from alkyl groups which may have been substituted, aryl groups which may have been substituted, hydroxy groups, alkoxy groups which may been substituted, aryloxy groups which may have been substituted, acyloxy groups which may have been substituted and halogen groups, and at least one of $J^1$ to $J^6$ represents a substitute group selected from a hydroxy group, an alkoxy groups which may have been substituted, an aryloxy group which may have been substituted, an acyloxy group which may have been substituted and a halogen group. As for concrete examples of these, alkyl groups, such as methyl groups, ethyl groups, vinyl groups, isopropyl groups and t-butyl groups, halogenated alkyl groups, such as chloropropyl groups and 3,3,3-trifluoropropyl groups, alkyl groups containing an epoxy group, such as γ-glycidoxy propyl groups and β-(3,4-epoxy cyclohexyl) ethyl groups, acryl groups containing a (meth)acryl group, such as γ-methacryloxy propyl groups and γ-acryloxypropyl groups, in addition to alkyl groups having a variety of substitute groups, such as mercapto groups, cyano groups and amino groups, aryl groups which may have been substituted, such as phenyl groups, naphthyl groups and styryl groups, alkoxy groups which may have been substituted, such as hydroxy groups, methoxy groups, ethoxy groups and methoxy ethoxy groups, acyloxy groups which may have been substituted, such as acetoxy groups, aryloxy groups which may have been substituted, such as phenoxy groups, halogen groups, such as chloro groups and bromo groups and the, like can be cited.

$J^1$ to $J^6$ are independent of each other, and may be of the same type or of different types.

Q represents a divalent organic group. No problem arises, even in the case where Q includes foreign atoms other than carbon and hydrogen, such as oxygen atoms, nitrogen atoms or the like. Furthermore, the organic group may be in chain form, and no problem arises, even in the case where an oxygen atom exists in an epoxy ring or the like, and this is rather preferable, from the point of view of this contributing as a functional group at the time of curing.

As for concrete examples of this, an ethendyl group, a methylene group, an ethylene group, a propylene group, a butanediyl group, a pentanediyl group, a hexanediyl group, a heptanediyl group, an octanediyl group, a nonanediyl group, a decanediyl group, an undecanediyl group, a dodecanediyl group, an octadiendiyl and the groups that are represented by the following formulas (gr1) to (gr9) can be cited.

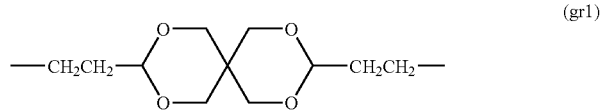
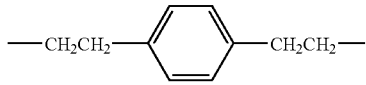
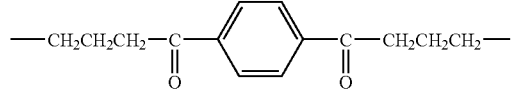
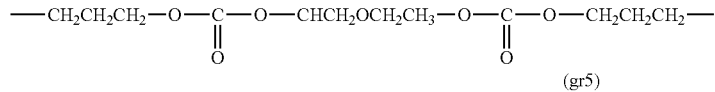
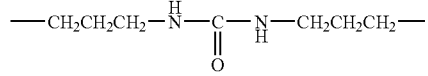
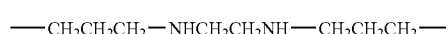
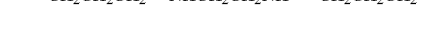

hydroxy groups, alkoxy groups which may been substituted, aryloxy groups which may have been substituted, acyloxy groups which may have been substituted and halogen groups, As for-concrete typical examples of compounds that are represented by general formulas (d1) and (d2), trialkoxy silanes, triacyloxy silanes and triphenoxy silanes, such as tetramethoxy silane, tetraethoxy silane, tetrabutoxy silane, tetrachloro silane, methyl trimethoxy silane, methyl triethoxy silane, methyl trimethoxy ethoxy silane, methyl triacetoxy silane, methyl tripropoxy silane, methyl tributoxy silane, methyl trichloro silane, ethyl trimethoxy silane, ethyl triethoxy silane, vinyl trimethoxy silane, vinyl triethoxy silane, vinyl triacetoxy silane, vinyltrimethoxy ethoxy silane, phenyl trimethoxy silane, phenyl triethoxy silane, phenyl triacetoxy silane, γ-chloropropyl trimethoxy silane, γ-chloropropyl triethoxy silane, γ-chloropropyl triacetoxy silane, γ-methacryloxypropyl trimethoxy silane, γ-aminopropyl trimethoxy silane, γ-aminopropyl triethoxy silane, γ-mercapto propyl trimethoxy silane, γ-mercapto propyl triethoxy silane, N-β-(aminoethyl)-γ-aminopropyl trimethoxy silane, β-cyanoethyl triethoxy silane, methyl triphenoxy silane, chloromethyl trimethoxy silane, chloromethyl triethoxy silane, glycidoxy methyl trimethoxy silane, glycidoxy methyl triethoxy silane, α-glycidoxy ethyl trimethoxy silane, α-glycidoxy ethyl triethoxy silane, β-glycidoxy ethyl trimethoxy silane, β-glycidoxy ethyl triethoxy silane, α-glycidoxy propyl trimethoxy silane, α-glycidoxy propyl triethoxy silane, β-glycidoxy propyl trimethoxy silane, β-glycidoxy propyl triethoxy silane, γ-glycidoxy propyl trimethoxy silane, γ-glycidoxy propyl triethoxy silane, γ-glycidoxy propyl tripropoxy silane, γ-glycidoxy propyl tributoxy silane, γ-glycidoxy propyl trimethoxy ethoxy silane, γ-glycidoxy propyl triphenoxy silane, α-glycidoxy butyl trimethoxy silane, α-glycidoxy butyl triethoxy silane β-glycidoxy-butyl trimethoxy silane, β-glycidoxy butyl triethoxy silane, γ-glycidoxy butyl trimethoxy silane, γ-glycidoxy-butyl triethoxy silane, δ-glycidoxy butyl trimethoxy silane, δ-glycidoxy butyl triethoxy silane, (3,4-epoxy cyclohexyl) methyl trimethoxy silane, (3,4-epoxy cyclohexyl) methyl triethoxy silane, β-(3,4-epoxy cyclohexyl) ethyl trimethoxy silane, β-(3,4-epoxy cyclohexyl) ethyl triethoxy, silane, β-(3,4-epoxy cyclohexyl) ethyl tripropoxy silane, β-(3,4-epoxy cyclohexyl) ethyl tributoxy silane, β-(3,4-epoxy cyclohexyl) ethyl trimethoxy ethoxy silane, β-(3,4-epoxycyclohexyl) ethyl trimethoxy ethoxy silane, β-(3,4-epoxy cyclohexyl) ethyl triphenoxy silane, γ-(3,4-epoxy cyclohexyl) propyl trimethoxy silane, γ-(3,4-epoxy cyclohexyl) propyl triethoxy silane, δ-(3,4-epoxy cyclohexyl) butyl trimethoxy silane and δ-(3,4-epoxy cyclohexyl) butyl triethoxy silane, as well as substances which are gained by hydrolyzing these, dialkoxy silanes, diphenoxy silanes and diacyloxy silanes, such as dimethyl dimethoxy silane, phenyl methyl dimethoxy silane, dimethyl diethoxy silane, phenylmethyl diethoxy silane, γ-chloropropyl methyl dimethoxy silane, γ-chloropropyl methyl diethoxy silane, dimethyl diacetoxy silane, γ-methacryloxy propyl methyl dimethoxy silane, γ-methacryloxy propyl methyl diethoxy silane, γ-mercapto propyl methyl dimethoxy silane, γ-mercapto propyl methyl diethoxy silane, γ-amino propyl methyl dimethoxy silane, styryl trimethoxy silane, styryl triethoxy silane, γ-amino propyl methyl diethoxy silane, methyl vinyl dimethoxy silane, methyl vinyl diethoxy silane, glycidoxy methyl methyl dimethoxy silane, glycidoxy methyl methyl diethoxy silane, α-glycidoxy ethyl methyl dimethoxy silane, α-glycidoxy ethyl methyl diethoxy silane, β-glycidoxy ethyl methyl dimethoxy silane, β-glycidoxy ethyl methyl diethoxy silane, α-glycidoxy propyl methyl dimethoxy silane, α-glycidoxy propyl methyl diethoxy silane, β-glycidoxy propyl methyl dimethoxy silane, β-glycidoxy propyl methyl diethoxy silane, γ-glycidoxy propyl methyl dimethoxy silane, γ-glycidoxy propyl methyl diethoxy silane, γ-glycidoxy propyl methyl dipropoxy silane, γ-glycidoxy propyl methyl dibutoxy silane, γ-glycidoxy propyl methyl methoxy ethoxy silane, γy-glycidoxy propyl methyl diphenoxy silane, γ-glycidoxy propyl methyl diacetoxy silane, γ-glycidoxy propyl ethyl dimethoxy silane, γ-glycidoxy propyl ethyl diethoxy silane, γ-glycidoxy propyl vinyl dimethoxy silane, γ-glycidoxy propyl vinyl diethoxy silane, γ-glycidoxy propyl phenyl dimethoxy silane and γ-glycidoxy propyl phenyl diethoxy silane, as well as substances which are gained by hydrolyzing these, and bis(trichlorosilyl) methane, 1,2-bis(trichlorosilyl) ethane, 1,4-bis(trichlorosilyl) butane, 1,6-bis(trichlorosilyl) hexane, 1,8-bis(trichlorosilyl) octane, 1,2-bis(trimethoxysilyl) ethylene, 1,2-bis(triethoxysilyl) ethylene, bis(trimethoxysilyl) methane, 1,2-bis(trimethoxysilyl) ethane, 1,4-bis(trimethoxysilyl) butane, 1,6-bis(trimethoxysilyl) hexane, 1,8-bis(trimethoxysilyl) octane, bis(triethoxysilyl) methane, 1,2-bis(triethoxysilyl) ethane, 1,4-bis(triethoxysilyl) butane, 1,6-bis(triethoxysilyl) hexane, 1,8-bis(triethoxysilyl) octane, 1,1-bis(trichlorosilylmethyl) ethylene, bis(trimethoxysilyl)-1,7-octadien, bis(triethoxysilyl)-1,7-octadien, bis[3-(trimethoxysilyl) propyl] tetrasulfide, bis[3-(triethoxysilyl) propyl] tetrasulfide, bis[3-(trimethoxysilyl) propyl] urea, bis[3-(triethoxysilyl) propyl] urea, bis[3-(trimethoxysilyl) propyl] amine, bis[3-(triethoxysilyl) propyl] amine, N,N'-bis[3-(trimethoxysilyl) propyl] ethylene diamine, N,N'-bis[3-(triethoxysilyl) propyl] ethylene diamine and the like can be cited.

The organopolysiloxane can have an anionic group, from the point of view of an increase in proton conductivity and compatibility with proton conductive polymers. As the anionic group, a sulfonic acid group, a carboxylic acid group and a phosphonic acid group are preferable. It is also preferable to use two or more types of these anionic groups at the same time, and in this case, effects such as an increase in durability can sometimes be gained, as compared with a case where these are used alone. An organopolysiloxane having such an anionic group is preferably used, because this makes an increase in the cross linking density and reduction only in fuel crossover possible, without damaging proton conductivity.

An organopolysiloxane having an anionic group can be gained from a silane compound which has an anionic group or a protected anionic group. As preferable silane compounds which have an anionic group or a protected anionic group, compounds that are represented by the below described formulas (c1) to (c9), for example, can be cited.

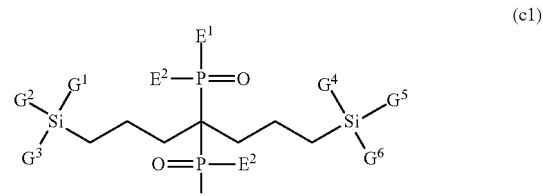

(c1)

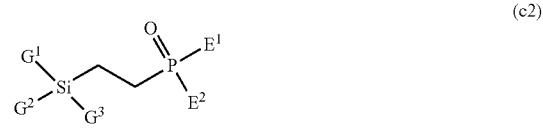

(c2)

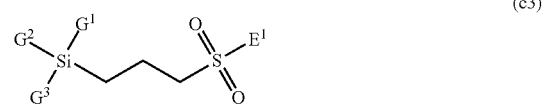

(c3)

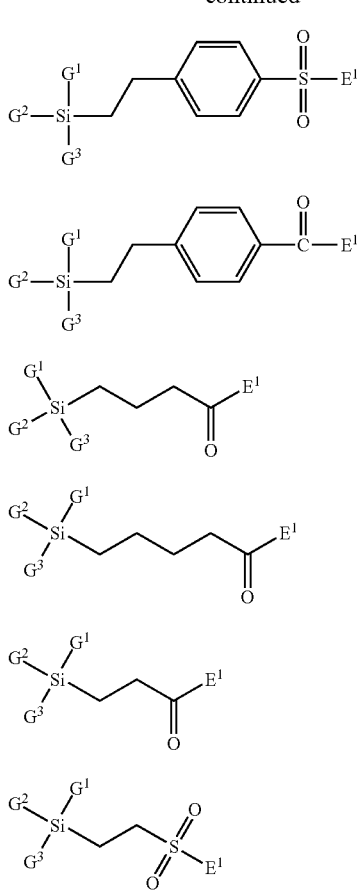

[$G^1$ to $G^6$ represent independent substitute groups selected from alkyl groups which may have been substituted, aryl groups which may have been substituted, hydroxy groups, alkoxy groups which may been substituted, acyloxy groups which may have been substituted and halogen groups, and at least one of $G^1$ to $G^6$ represents a substitute group selected from a hydroxy group, an alkoxy groups which may have been substituted, an acyloxy group which may have been substituted and a halogen group, and $E^1$ and $E^2$ represent independent substitute groups selected from hydroxy groups, siloxy groups which may have been substituted, alkoxy groups which may have been substituted, aryloxy groups which may have been substituted and halogen groups.]

From among these silane compounds having an anionic group, the compounds represented by formula (c4) are particularly preferable, from the point of view of availability and high proton conductivity. In addition, the compounds of formula (c1) are particularly preferable from the point of view of the significance of the effects of reducing fuel crossover, such as of methanol.

These silane compounds having an anionic group may be used alone or may be used together with a silane compound which does not have an anionic group.

It is preferable to make hydrolysis occur in order to lower the temperature for curing these silane compounds and further make curing progress. Hydrolysis can be made to occur by mixing pure water or an acidic solution, such as hydrochloric acid, acetic acid or nitric acid, and stirring this. In addition, the degree of hydrolysis can be controlled by adjusting the mixed amount of pure water or the acidic solution. At the time of hydrolysis, it is preferable to mix pure water or an acidic solution of which the molarity is no less than that of the group having hydrolysis properties in the silane compound, and no greater than a molarity that is three times as large as that of the group having hydrolysis properties, in order to accelerate curing. Though when hydrolysis occurs, alcohol or the like is generated, and therefore, hydrolysis can be made to occur without a solvent, it is desirable to make hydrolysis occur after the silane compound has been mixed with a solvent, in order to make hydrolysis uniform. In addition, it is also possible to make hydrolysis occur while removing an appropriate amount of alcohol or the like through hydrolysis under the application of heat and/or reduced pressure, depending on the purpose, or it is also possible to make hydrolysis occur while adding an appropriate solvent. As the solvent that can be used at the time of hydrolysis, solvents including alcohol, ester, ether, ketone, halogenated hydrocarbon, aromatic hydrocarbon, such as toluene and xylene, N,N-dimethyl formamide, N,N-dimethyl acetamide, N-methyl pyrrolidone, dimethyl imidazolidinone and dimethyl sulfoxide can be cited. It is possible to utilize these solvents in the form of a mixed solvent of two or more types, if necessary. In addition, it is possible to heat these to room temperature or higher, in order to accelerate the hydrolysis reaction and further accelerate reactions such as preliminary condensation, depending on the purpose, and it is possible to make hydrolysis occur when the temperature for hydrolysis is lowered to room temperature or lower, in order to restrict preliminary condensation.

In addition titania, zirconia, alumina and the like can be cited as the inorganic cross linking polymers that are used a s other polymers (B), and each of these can be gained by condensing a corresponding metal alkoxide.

In a polymer electrolyte of the present invention, it is preferable for the weight ratio of the composition of the above described proton conductive polymer (A) to the above described polymer (B) to be no less than 0.05 and no greater than 20. In the case where this ratio is less than 0.05, sufficient proton tends not to be gained, which is not preferable. In the case where the ratio exceeds 20, sufficient effects of reducing fuel crossover tend not to be gained, which is not preferable.

Next, an example is cited in order to describe a method for fabricating a polymer electrolyte membrane using a polymer electrolyte of the present invention. The present invention is, of course, not limited to this description.

A method for fabricating a film from a material in the state of being a solution, a method for fabricating a film from a material in a melted state and the like can be cited as a method for gaining a polymer electrolyte membrane of the present invention. The material of the polymer electrolyte membrane, that is to say, at least one of the above described proton conductive polymer (A) and the above described polymer (B), or a precursor thereof (such as a monomer, an oligomer or the like), are used in the state of being a solution or in a melted state, for the fabrication of a membrane. In the case where (A) and/or (B) are made of a cross linking polymer, it is preferable to fabricate a membrane using a precursor, so that the fabricated membrane is converted into a cross linking polymer.

As for a method for fabricating a membrane from a material in the state of being a solution, a method for fabricating a membrane by applying the solution to a plate or a film in accordance with an appropriate coating method and removing the solvent can be cited. As for the coating method, techniques such as spray coating, painting with a brush, dip coating, dye coating, curtain coating, flow coating, spin coating and screen printing can be applied, but the present invention is not limited to these. The solvent that is used for fabricating a membrane is not particularly limited, as long as it dissolves the material, and after that, can be removed through the application of heat or by reducing pressure, and non-proton polar solvents, such as N,N-dimethyl acetamide, N,N-dimethyl formamide, N-methyl-2-pyrrolidone, dimethyl sulfoxide, sulfolane, 1,3-dimethyl-2-imidazolidinone and hexamethyl phosphonic phosphonate triamide, alkylene glycol monoalkyl ethers, such as alcohol based solvents, such as ethylene glycol monomethyl ether, ethylene glycol monoethyl ether, propylene glycol monomethyl ether and propylene glycol monoethyl ether, and alcohol based solvents, such as methanol, ethanol and 2-propanol, for example, are appropriate for use. The membrane thickness can be controlled by adjusting the concentration of the solution or the thickness of application to a substrate.

In the case where a membrane is fabricated from the material in a melted state, a melt pressing method and a melt extrusion method can be used. In addition, in the case where a precursor is used as the material, it becomes possible to fabricate a membrane through coating on a plate or a form when the material is melted at room temperature.

In the case where a membrane of a precursor is fabricated, the reaction is completed by applying heat, light, energy beams or the like, and thus, the precursor is converted into a polymer.

Usually, a membrane having a thickness of 3 μm to 2000 μm is appropriate for use. It is preferable for the membrane to be thicker than 3 μm, in order to gain a strength for the membrane that is durable in practical use, while it is preferable for the membrane to be thinner than 2000 μm, in order to achieve reduction in the resistance of the membrane, that is to say, an increase in the power generating performance. A more preferable range for the membrane thickness is 5 μm to 1000 μm.

Next, examples of a method for gaining the polymer electrolyte membrane of the present invention by mixing the above described proton conductive polymer (A) and the above described polymer (B) are described. The same techniques can be applied in the case where a polymer electrolyte of the present invention is applied to a catalyst layer. These examples are illustrative, and it is also possible to fabricate a membrane by adopting other appropriate methods.

The first method is a method for fabricating a membrane from the mixture of proton conductive polymer (A) in the state of being a solution or in a melted state, or its precursor, and polymer (B) in the state of being a solution or in a melted state, or its precursor.

The second method is a method for fabricating a membrane by making one of proton conductive polymer (A) and polymer (B), or its precursor, in the state of being a solution or in a melted state make contact with or impregnate a membrane made of the other polymer.

In addition, when a polymer electrolyte of the present invention is manufactured, an additive that is used for conventional polymer compounds, such as a plasticizing agent, a stabilizer or a mold release agent, can be used within a range which does not make the polymer electrolyte deviate from the object of the present invention.

It is preferable for the density of the anionic group in a polymer electrolyte of the present invention to be 0.1 mmol/g to 5.0 mmol/g, from the point of view of proton conductivity and resistance to alcohol solutions, and it is more preferable for it to be 0.5 mmol/g to 3.5 mmol/g. When the density of the anionic group is lower than 0.1 mmol/g, the proton conductivity tends to be lowered, while when the density of the anion group is higher than 5.0 mmol/g, sufficient suppression of fuel crossover and mechanical strength may not be gained when used for a polymer electrolyte fuel cell.

Here, the density of the anionic group is the same as the molarity of the anionic group that has been introduced per gram unit of the polymer electrolyte. It is possible to find the density of the anionic group by means of a nuclear magnetic resonance spectrum method, element analysis, neutralization titration or the like. The density of the anionic group is found, irrespectively of the purity of the sample, and therefore, a nuclear magnetic resonance spectrum method is preferable, while element analysis is preferable because of ease of measurement, in the case where the spectrum is complicated, making calculation of the density of the anionic group difficult. Neutralization titration is preferable when calculation of the density of the anionic group is difficult by element analysis.

Though the proton conductivity of a polymer electrolyte of the present invention at room temperature is not particularly limited, as long as it is at a sufficient level for use for a polymer electrolyte fuel cell, it is preferable for it to be no less than 10 mS/cm at 25° C., it is more preferable for it to be no less than 30 mS/cm, and it is most preferable for it to be no less than 60 mS/cm. In the case of less than 10mS/cm, a polymer electrolyte fuel cell may fail to have sufficient power generating performance.

In a polymer electrolyte of the present invention, it is preferable for fuel crossover, when being measured using a 1 M methanol solution at 20° C., to be no greater than 120 nmol/cm·minute, from the point of view of high output and high energy capacity being gained in a region where the concentration of the methanol solution of the fuel is high in a polymer electrolyte fuel cell that is gained from the polymer electrolyte. It is more preferable for it to be no greater than 100 nmol/cm·minute, and it is most preferable for it to be 80 nmol/cm·minute. In addition, though it is preferable for the lower limit value of fuel crossover to be 0 nmol/cm·minute, extremely low fuel crossover frequently causes damage in proton conductivity, and therefore, a realistic lower limit is 1 nmol/cm·minute.

In the present invention, it is also possible to fill in a porous base in membrane form with a polymer electrolyte, and deformation of a polymer electrolyte membrane that has been gained in this manner due to swelling is suppressed, which is preferable.

The form of the porous base is not particularly limited, a form having a number of pores can be cited as an example, and a porous base having a number of independent collimated pores in the direction of the thickness or an inter penetrated structure is preferable. As examples of a method for creating a number of independent collimated pores, a lithographic method, a chemical etching method, a needle punching method, a water jet method, a laser method, a neutron beam method and the like can be cited.

The inter penetrated structure indicates a state where a polymer that forms a porous base has three-dimensionally continuous pores.

In the case where a porous base has an inter penetrated structure, it is preferable for the diameter of pores to be in a range from 0.05 μm to 5 μm, and it is more preferable for it to be in a range from 0.1 μm to 1 μm. The diameter of pores can be found as the average of the diameters of 20 pores or more, preferably 100 pores or more, from a photograph where the surface of a base is taken by a scanning electron microscope (SEM) or the like, and in general, the average is found from 100 pores. A porous base having an inter, penetrated structure that has been manufactured in accordance with wet coagulation has wide distribution in the diameter of the pores, and therefore, it is preferable to find the average diameter of the pores from, for example, 100 pores to 500 pores.

It is preferable for the porosity of the inter penetrated structure to be in a range from 10% to 95%. It is more preferable for it to be in a range from 50% to 90%. Here, the porosity is a percentage (%) that is gained by dividing the value that is gained by subtracting the volume occupied by the polymer from the entire volume of the porous base by the entire volume of the porous base.

Wet coagulation is preferably used as a manufacturing method for a porous base having the above described inter penetrated structure. In the case where a porous base is used for a polymer electrolyte membrane, as shown in FIG. 1, a preferred embodiment provides a form where the center is a porous portion and the periphery is a dense polymer film. In order to gain such a form, the following methods, for example, are preferably used, but the invention is not limited to these.

As the first method, a method for fabricating a dense film for only the peripheral portion in advance, and after that, fabricating the center porous portion can be cited. The dense film is fabricated by applying, for example, a polymer solution to a substrate, which is then dried in a conventional manner. The portion for the porous center may be cut out afterwards, or it is possible not to apply the polymer solution in the center by masking the center at the time of application. After that, the polymer solution is applied only to the center, and after that, pores are provided.

As the second method, a film having pores throughout the entirety is fabricated, and pores in the peripheral portion are filled in. A method for filling in the pores through application of heat and pressure, a method for filling in the pores with a non-proton conductive polymer and the like can be used to fill in the pores, but the invention is not limited to these.

Though the polymer that is used for the porous base used in the present invention is not particularly limited preferably, polyimide (PI), polyvinylidene fluoride (PVDF), polyphenylene sulfide sulfone (PPSS), polytetrafluoro ethylene (PTFE), polysulfone (PSF), polyether sulfone (PES) polycarbonate (PC), polyethylene (PE), polyamide and the like, as well as copolymers of these and copolymers with another monomer (such as hexafluoro propylene-vinylidene fluoride copolymers), and blends can be used. These polymers are preferable, from the point of view of resistance to oxidation, strength, ease of wet coagulation and the like.

The method for filling in a porous base with the above described polymer electrolyte is not particularly limited. It is possible, for example, to fill in the pores with a polymer electrolyte by providing the polymer electrolyte as a solution which is applied to the porous base or in which the porous base is immersed. It is preferable to use ultrasonic waves or reduce pressure in order to make filling of the pores easy, and in the case where these methods are used at the time of application or immersion, the efficiency of filling further increases, which is preferable. In addition, a method for filling in the pores with a monomer which is a precursor of the polymer electrolyte, and afterwards, polymerized within the pores, or a method for vaporizing the monomer and then plasma polymerizing it may be carried out.

The form of the polymer electrolyte fuel cell and the method for fabricating a polymer electrolyte fuel cell are not particularly limited in the present invention. An example of the method for fabricating a polymer electrolyte fuel cell having a side-by-side structure is described in detail in the following. Here, side-by-side structure means a structure where two or more cells made of one facing electrode are placed in the plane of the surface of a single polymer electrolyte membrane. In this structure, anodes and cathodes of two or more cells which are placed adjacent to each other are connected by means of an electron conductor, which penetrates through a polymer electrolyte membrane, and thereby, the cells are connected in series, and therefore, the cross section of a polymer electrolyte membrane having a side-by-side structure is that of a structure where proton conductive areas and electron conductive areas alternately exist.

FIGS. 2 and 3 show an example of the side-by-side structure. FIG. 2 is a schematic perspective diagram showing a polymer electrolyte membrane having a side-by-side structure according to the present invention, and FIG. 3 is a schematic cross sectional diagram showing portions of the manufacturing process thereof. Here, though in FIGS. 2 and 3, two cells which are placed side-by-side are illustrated, it is also possible to place three or more cells in a plane of the side-by-side structure in the same manner. In the following, the case of two cells is described. In FIG. 2, a porous portion 1 in the proton conductive area is filled in with a polymer electrolyte, not shown, and a conductive area in membrane 4 in the electron conductive area is filled in with an electron conductor. The portion other than porous portion 1 of the proton conductive area, and conductive area in membrane 4 of the electron conductive area is a non-porous area 2 where protons and electrons are not conducted, and is made of a dense polymer film. The porous base shown in FIG. 2 is converted into a polymer electrolyte membrane in accordance with the method illustrated in FIG. 3. Though in FIG. 3, the membrane penetrating electron conductive area is filled in with an electron conductor in advance, and after that, the proton conductive area is filled in with a polymer electrolyte, the order may be the opposite. In addition, the proton conductive area may be fabricated by filling it in with a polymer electrolyte, and then, an electrode may be provided, and finally, the electron conductive area may be fabricated.

The electron conductive area in the above described side-by-side structure has a structure where the polymer electrolyte membrane is penetrated. Here, the portion that penetrates through the polymer electrolyte membrane as the electron conductive area is referred to as conductive area in membrane. This conductive area in membrane has a function that is different from that of the porous portion, which is to be filled in with a polymer electrode. The size, the form and the like of this conductive area in membrane are not particularly limited. The greater the conductive area in membrane is, the lower the electrical resistance between cells becomes, in such a manner that an increase in the voltage can be expected in a series connection. Here, the greater the conductive area in membrane is, the higher the possibility of fuel, such as hydrogen or methanol, leaking from the anode side to the cathode side, or the possibility of air leaking from the cathode side to anode side becomes, and lowering of performance may be caused. Therefore, it is preferable to determine the size and the form of the conductive area in membrane taking into consideration the electrical resistance and the resistance to leakage of the electron conductor that is used in the electron conductive area. Here, the electron conductive area may pass through the outside instead of penetrating through the polymer electrolyte membrane.

Though the electron conductor of the above described conductive area in membrane 4 is hot particularly limited, a conductive paste is preferably used. Conductive pastes where a conductive agent, such as carbon, silver, nickel, copper, platinum or palladium is dispersed in a polymer can preferably be used, and reduction in the electron resistance and an increase in the resistance to leakage can be achieved at the same time. Particularly, in a direct type fuel cell, it is important to prevent leakage of liquid fuel, such as methanol, and a conductive paste where carbon black, silver, platinum or the like is dispersed in PVDF or polyimide, in addition to a general purpose conductive paste where carbon or silver is dispersed in a silicone resin, polyester, an epoxy resin or the like, is preferably used. An electron conductive area 5 is electrically connected to an electrode base or an electrode catalyst layer of the cell, and a conductive paste is preferably used in order to lower this contact resistance.

In addition, a metal foil or a metal wire, such as nickel, stainless steel, aluminum or copper, may be used for electron conductive area 5. in addition, it is possible to combine such a metal foil or metal wire with a conductive paste.

A polymer electrolyte of the, present invention can be combined with an electrode 7 that is formed of an electrode base and an electrode catalyst layer as a polymer electrolyte membrane, or can be used as a proton conductor in the electrode catalyst layer, so as to be used as a membrane electrode assembly (MEA) for a polymer electrolyte fuel cell.

The electrode catalyst layer in electrode 7 of a polymer electrolyte fuel cell of the present invention is not particularly limited, and it is possible to use a known electrode catalyst layer. The electrode catalyst layer includes a catalyst and an electrode active material (referred to as material for oxidation or reduction), which is required for the reaction in the electrode, and furthermore, means a layer that includes a material which contributes to electron conduction or proton conduction for accelerating the reaction in the electrode. In addition, in the case where the electrode active material is a liquid or a gas, it is necessary for the layer to have a structure where such a liquid or gas easily permeates, and it is necessary for it to have a structure for accelerating discharge of the materials produced as a result of the reaction in the electrode.

In a polymer electrolyte fuel cell of the present invention, as the electrode active material, fuel, such as hydrogen or methanol, or oxygen, are preferable, and as an appropriate example of the catalyst, precious metal particles, such as of platinum, can be cited. In addition, it is preferable for the cell to include a material which improves the conductivity of the electrode catalyst layer, of which the form is not particularly limited, and it is preferable for it to have, for example, conductive particles. As for the conductive particles, carbon black and the like can be cited, and in particular, platinum carrying carbon and the like are preferably used as the carbon black which carries the catalyst. it is necessary for the electrode catalyst layer to have a structure where the catalyst, the electron conductor (for example, carbon black) and the proton conductor (for example, proton conductive polymer) make contact with each other, in such a manner that the electrode active material and the material produced as a result of reaction efficiently enters and exits. In addition, a polymer compound is effective for improving the proton conductivity, increasing the adhesion of the materials and enhancing water repellency. Accordingly, it is preferable for the electrode catalyst layer to include at least catalyst particles, conductive particles and a polymer compound.

Though a known catalyst can be used as the catalyst that is included in the electrode catalyst layer of a polymer electrolyte fuel cell of the present invention, and is not particularly limited, a precious metal catalyst, such as platinum, palladium, ruthenium, lithium or gold, is preferably used. In addition, two or more types of elements may be included in the form of an alloy or a mixture of these precious metal catalysts.

Though the electron conductor (conductive material) that is included in the electrode catalyst layer is not particularly limited, an inorganic conductive material is preferably used, from the point of view of electron conductivity and resistance to corrosion. In particular, carbon materials, such as carbon black, graphite and carbon, and metals and semi-metals can be cited. Here, from among the carbon materials, carbon blacks, such as channel black, thermal black, furnace black and acetylene black, are preferably used, from the point of view of electron conductivity and specific surface area. As the furnace rack, Vulcan XC-72, Vulcan P, Black Pearls 880, Black Pearls 1100, Black Pearls 1300, Black Pearls 2000 and Regal 400, made by Cabot Corporation, Ketjen Black EC, made by Ketjen Black International Company, #3150 and #3250, made by Mitsubishi Chemical Co., Ltd. and the like can be cited, and as the acetylene black, Denka Black, made by Denki Kagaku Kogyo Kabushiki Kaisha and the like can be cited. In addition to carbon black, natural graphite, pitch, coke, artificial graphite and carbon which are gained from organic compounds, such as polyacrylonitrile, phenol resins and furan resins, and the like can be used. The forms of these carbon materials are not particularly limited, and it may be in particle form or fiber form. In addition, it is possible to use carbon materials that are gained by post-processing the above described carbon materials. From among these carbon materials, Vulcan XC-72, made by Cabot Corporation, is preferably used, from the point of view of electron conductivity.

Though an appropriate added amount for these electron conductors should be determined in accordance with the required electrode properties and the specific surface area and the electron resistance of the used material, it is preferable for the weight ratio in the electrode catalyst layer to be in a range from 1% to 80%, and it is more preferable for it to be in a range from 20% to 60%. In the case where the amount of the electron conductor is small, the electron resistance becomes high, while in the case where it is large, gas permeability is hindered, and the ratio of use of the catalyst is lowered, and in both cases, the performance of the electrode is lowered.

It is preferable for the electron conductor to be uniformly dispersed together with the catalyst particles, from the point of view of the performance of the electrode. Therefore, it is preferable for the catalyst particles and the electron conductor to be well-dispersed in a coating liquid in advance.

As the electrode catalyst layer, a catalyst carrying carbon where a catalyst and an electron conductor are utilized is used according to a preferred embodiment. A catalyst carrying carbon is used in this manner, and thereby, the efficiency of the catalyst increases, which can contribute to reduction in cost. Here, in the case where a catalyst carrying carbon is used for the electrode catalyst layer, it is possible to further add a conductive agent. As for such a conductive agent, the carbon black, as described above, is preferably used.

It is possible to use a known proton conductor as that used for the electrode catalyst layer. A variety of organic and inorganic materials are generally known as the proton conductor, and in the case where it is used for a polymer electrolyte fuel cell, a polymer having an anionic group, such as a sulfonic acid group, a carboxylic acid group and a phosphoric acid group, which increases the proton conductivity, is preferably used. In particular, a polymer having an anionic group which is formed of a fluoroalkyl ether side chain and a fluoroalkyl main chain is preferably used. Nafion, made by Dupont, Aciplex, made by Asahi Kasei Corporation, and Flemion, made by Asahi Glass Co., Ltd., for example, are preferably used. In addition, a polymer electrolyte of the present invention is appropriate for use. These proton conductors are provided in the electrode catalyst layer in a state of being a solution or dispersion liquid. At this time, though the solvent in which a polymer is dissolved or dispersed is not particularly limited, a polar solvent is preferable, from the point of view of solubility of the proton conductor.

Though it is preferable for the proton conductor to be added in advance to a coating liquid of which the main component materials are electrode catalyst particles and an electron conductor, and applied in a state of being uniformly dispersed when an electrode catalyst layer is fabricated, from the point of view of electrode performance, the proton conductor may be applied after the electrode catalyst layer has been applied. Here, as the method for applying a proton conductor to an electrode catalyst layer, spin coating, application with a brush, dip coating, dye coating, curtain coating, flow coating and the like can be cited, and the method is not particularly limited.

Though an appropriate amount of the proton conductor that is included in the electrode catalyst layer should be determined in accordance with the required electrode properties and the conductance of the proton conductor to be used, and is not particularly limited, it is preferable for the weight ratio to be in a range from 1% to 80%, and it is more preferable for it to be in a range from 5% to 50%. In the case where the amount of the proton conductor is too small, the proton conductivity becomes low, while in the case where it is excessive, the gas permeability is hindered, and in both cases, the electrode performance may be lowered.

The electrode catalyst layer may include a variety of materials in addition to the above described catalyst, electron conductor and proton conductor. In particular, it is preferable to include a polymer other than the above described proton conductor, in order to enhance the adhesiveness of the materials that are included in the electrode catalyst layer. Though polymers that include a fluorine atom can be cited as this polymer, which is not limited, polyvinyl fluoride (PVF), polyvinylidene fluoride (PVDF), polyhexafluoro propylene (FEP), polytetrafluoro ethylene, polyperfluoro alkyl vinyl ether (PFA), copolymers of these, copolymers of a monomer unit that forms these polymers and another monomer, such as ethylene or styrene, as well as blends of these polymers, for example, can also be used. It is preferable for the weight ratio of the content of these polymers in the electrode catalyst layer to be in a range from 5% to 40%. In the case where the content of the polymer is too great, electron and ion resistance increase, and the performance of the electrode tends to be lowered.

The catalyst-polymer assembly of the electrode catalyst layer may have an inter penetrated structure according to a preferred embodiment. This is a case where the catalyst-polymer assembly has an inter penetrated structure where such assembly is a polymer complex that includes catalyst particles. That is to say, the catalyst-polymer assembly is in a state of having continuous pores which are three-dimensionally connected.

In the case where the electrode catalyst layer has an inter penetrated structure, it is preferable for the diameter of these pores to be in a range from 0.05 μm to 5 μm, and it is more preferable for it to be in arrange from 0.1 μm to 1 μm. The diameter of pores can be found as the average of the diameters of 20 pores or more, preferably 100 pores or more, from a photograph where the surface of a base is taken by a scanning electron microscope (SEM) or the like, and in general, the average is found from 100 pores. A porous base having an inter penetrated structure that has been manufactured in accordance with wet coagulation has wide distribution in the diameter of the pores, and therefore, it is preferable to find the average diameter of the pores from 100 pores to 500 pores.

It is preferable for the porosity of the inter penetrated structure of the electrode catalyst layer to be in a range from 10% to 95%. It is more preferable for it to be in a range from 50% to 90%. Here, the porosity is a percentage (%) that is gained by dividing the value that is gained by subtracting the volume occupied by the catalyst-polymer assembly from the entire volume of the electrode catalyst layer by the entire volume of the electrode catalyst layer.

For the fabrication of an electrode catalyst layer having an inter penetrated structure, wet coagulation is usually carried out after a catalyst layer has been applied to an electrode base, an ion exchange membrane and other bases. In the case where it is difficult to find the porosity of only the electrode catalyst layer, it is possible to find the porosity of the electrode base, the ion exchange membrane and other bases in advance, and then find the porosity of these bases, including the electrodes catalyst layer, and after that, the porosity of only the electrode catalyst layer.

The electrode catalyst layer having an inter penetrated structure has a large porosity, and gas diffusion and discharge of produced water are excellent, and in addition, the electron conductivity and the proton conductivity are also excellent. In accordance with a conventional method for creating pores, the diameter of the catalyst particles and the particle diameter of the polymer to be added are increased, and formation of spaces is carried out using a pore creating agent, and according to such a pore creation system, the contact resistance between the catalyst carrying carbon particles and between proton conductor particles becomes great, in comparison with that of the electrode catalyst layer. In contrast to this, in the inter penetrated structure in accordance with wet coagulation, the polymer assembly that includes a catalyst carrying carbon has an inter penetrated structure, and therefore, electrons or protons are easily conducted through this polymer assembly, and furthermore, a microscopic porous structure, which is a structure where gas diffusion and discharge of the produced water are excellent is gained, which is preferable.

In the case where the electrode catalyst layer has an inter penetrated structure, it is possible to use the same materials for the catalyst, the electron conductor and the proton conductor as those in the prior art.

The main components of the catalyst-polymer assembly are catalyst carrying carbon and a polymer. Though an appropriate ratio for these should be determined in accordance with the required electrode properties, and is not particularly limited, it is preferable for the weight ratio of the catalyst carrying carbon/the polymer to be 5/95 to 95/5. In the case where the catalyst-polymer assembly is used as an electrode catalyst layer for a polymer electrolyte fuel cell particularly, it is preferable for the weight ratio of the catalyst carrying carbon/ the polymer to be 40/60 to 85/15.

A variety of additives can be added to the catalyst-polymer assembly. There are, for example, a conductive agent, such as carbon, for increasing the electron conductivity, a polymer for increasing the adhesiveness, and an additive for controlling the diameter of pores in the inter penetrated structure, which can be used without any particular limitation. As for the added amount of these additives, it is preferable for the weight ratio relative to the catalyst-polymer assembly to be in a range from 0.1% to 50%, and it is more preferable for it to be in a range from 1% to 20%.

As the manufacturing method for a catalyst-polymer assembly having an inter penetrated structure, wet coagulation is preferable. Here, the catalyst-polymer solution composition is applied, and after that, this application layer is made to make contact with a solvent for making the polymer coagulate, and thereby, coagulation deposition of the catalyst-polymer solution composition and sampling of the solvent can be carried out at the same time. In this catalyst-polymer solution composition, catalyst carrying carbon is uniformly dispersed in a polymer solution. The above described catalyst carrying carbon and the polymer are preferably used. An appropriate solvent for solving the polymer should be determined in accordance with the used polymer, and is not particularly limited. It is important for the catalyst carrying carbon to be well dispersed in the polymer solution. In the case where the state of dispersion is poor, the catalyst carrying carbon and the polymer cannot form an assembly at the time of wet coagulation, which is not preferable.

As for the method for applying the catalyst-polymer solution composition, though an application method in accordance with the viscosity and the solidity of the catalyst-polymer solution composition is selected, and is not particularly limited, general application methods, such as ones using a knife coater, a bar coater, a spray, a dip coater, a spin coater, a roll coater, a dye coater and a curtain coater can be used.

In addition, though the coagulating solvent for making the polymer wet coagulate is not particularly limited, solvents which make the used polymer easily coagulate and deposit, and have compatibility with the solvent of the polymer solution are preferable. Though methods for making the base and the coagulating solvent make contact with each other are not particularly limited, methods for immersing the entire base in the coagulating solvent, making only the application layer make contact with the surface of the liquid of the coagulating solvent, for showering an application layer or spraying the coagulating solvent and the like can be used.

In the case where the base to which this catalyst-polymer solution compound is applied is either an electrode base or a polymer electrode, it is possible to carry out wet coagulation after the application. In addition, the catalyst-polymer solution compound may be applied to a base other than the electrode base or the polymer electrolyte (for example, a transferring base), and after that, wet coagulation may be carried out and an inter penetrated structure fabricated, and subsequently, this electrode catalyst layer may be transferred onto an electrode base or a polymer electrolyte or held between the bases or the base and the polymer electrolyte. As for the transferring base in this case, a sheet of polytetrafluoro ethylene (PTFE), or a glass plate or a metal plate of which the surface is processed with a fluorine or silicone based mold releaser may be used.

The electrode base is not particularly limited, and it is possible to use a known electrode base in a polymer electrolyte fuel cell of the present invention. In addition, in some cases, it may be that no electrode base is used, in order to save space.

As for the electrode base that is used in the present invention, it is possible to use any base having low electrical resistance which can collect (supply) electricity, without any particular limitations. As the material for forming the electrode base, one of which the main component is a conductive inorganic material, for example, can be cited, and as examples of such a conductive inorganic material, a baked product of polyacrylonitrile, a baked product of pitch, carbon materials, such as graphite and inflated graphite, stainless steel, molybdenum and titanium can be cited.

Though the form of the conductive inorganic material of the electrode base is not particularly limited, and fiber form or particle form, for example can be used, a conductive inorganic material in fiber form (inorganic conductive fiber), in particular, a carbon fiber, is preferable, from the point of view of gas permeability. Either structure, woven cloth or non-woven cloth, can be used for the electrode base that uses an inorganic conductive fiber. TGP series and SO series carbon paper, made by Toray Co., Ltd, and carbon cloth made by the E-TEK Div. of De Nora N. A., Inc., for example, can be used.

As for the woven cloth, plain weave, twill weave, satin weave, figured weave, lacing weave and the like can be used without any particular limitation. In addition, as the non-woven cloth, cloths made in accordance with a paper making method, a needle punching method, a spun bonding method, a water jet punching method, a melt blow method and the like can be used without any particular limitation. In addition, knit articles may be used. From among these cloths, particularly in the case where a carbon fiber is used, a woven cloth that is gained by converting plain weave using anti-flamed fiber into carbon or graphite, non-woven cloth that is gained by processing anti-flamed fiber into a non-woven cloth in accordance with a needle punching method or a water jet punching method, and after that, converting it into carbon or graphite, a mat non-woven cloth that has been made of an anti-flamed fiber, carbonized fiber or graphite fiber in accordance with a paper making method and the like are preferably used. In particular, it is preferable to use a non-woven-cloth, from the point of view of providing a cloth that is thin and strong.

In the case where an inorganic conductive fiber made of a carbon fiber is used for the electrode base, a polyacrylonitrile (PAN) based carbon fiber, a phenol based carbon fiber, a pitch based carbon fiber, a rayon based carbon fiber and the like can be cited as examples of the carbon fiber. From among these, a PAN based carbon fiber is preferable. This is because a PAN based carbon fiber generally has a high strength for compression and a high tensile broken ratio, making it difficult to break, in comparison with a pitch based carbon fiber. It is preferable for the temperature for carbonizing the carbon fiber to be no higher than 2500° C., in order to gain a carbon fiber which is difficult to make, and it is more preferable for it to be no higher than 2000° C.

A water repelling process for preventing the reduction in gas diffusion and permeability due to water retention, a partial repelling or hydrophilic process for forming a path for discharging water, addition of a carbon powder for lowering the resistance and the like may be carried out on the electrode base that is used for a polymer electrolyte fuel cell according to a preferred embodiment of the present invention.

In the case where a polymer electrolyte fuel cell of the present invention has a side-by-side structure, a diffusion layer may be provided in accordance with a preferred embodiment, in order to accelerate the intake of fuel, such as hydrogen or a methanol solution, or air, and the discharge of products such as water or carbon dioxide. The above described electrode base has the same function as such a diffusion layer, and it is preferable to use a non-conductive cloth as a diffusion layer. Here, as the material for forming a non-conductive cloth, non-conductive fibers, for example, can be used without any particular limitation.

As for the non-conductive fibers that form a non-conductive cloth of a diffusion layer, polytetrafluoro ethylene (PTFE), tetrafluoro ethylene-hexafluoro ethylene copolymer (FET), tetrafluoro ethylene-perfluoro alkyl vinyl ether copolymer (PFA), tetrafluoro ethylene-ethylene copolymer (ETFE), polyvinylidene fluoride (PVDF), polyvinyl fluoride (PVF), polychlorotrifluoro ethylene (CTFE), polyethylene chloride, anti-flamed polyacrylonitrile, polyacrylonitrile, polyester, polyamide and polyethylene, polypropylene, for example, can be used. From among these non-conductive fibers, fibers made of a polymer containing fluorine atoms, such as PTFE, FEP, PFA, ETFE, PVDF, PVF and CTFE are preferable, from the point of view of resistance to corrosion at the time of the reaction in the electrode.

Either structure, woven cloth or non-woven cloth, can be used as the non-conductive cloth of the diffusion layer. As for the woven cloth, plain weave, twill weave, satin weave, figured weave, lacing weave and the like can be used without any particular limitation. In addition, as the non-woven cloth, cloths made in accordance with a paper making method, a needle punching method, a spun bonding method, a water jet punching method, a melt blow method and the like can be used without any particular limitation. In addition, knit articles may be used. From among these cloths, in particular, plain weave and non-woven cloths, made in accordance with a needle punching method and a water jet punching method, a mat non-woven cloth made in accordance with a paper making method and the like are preferably used. In particular, non-woven cloths are preferably used, from the point of view of providing a porous cloth which is thin and strong.

A water repelling process for preventing reduction in the gas diffusion and permeability due to water retention, a partial water repelling or hydrophilic process for forming a path for discharging water and the like may be carried out on the non-conductive cloth of the diffusion layer in accordance with a preferred embodiment. Furthermore, post-processes, such as heat treatment, expansion and pressing may be carried out in accordance with a preferred embodiment. As a result of these post-processes, effects such as reduction in the thickness of the membrane, an increase in the porosity and an increase in the strength can be expected.

It is preferable in a polymer electrolyte fuel cell of the present invention for a conductive middle layer which contains at least an inorganic conductive material and a hydrophobic polymer to be provided between the electrode base and the electrode catalyst layer. In particular, in the case where the electro base is made of a carbon fiber textile or non-woven cloth having a large porosity, reduction in the performance due to permeation of the electrode catalyst layer into the electrode base can be prevented by providing a conductive middle layer.

In the case where a high polymer electrolyte of the present invention is used for, for example, a membrane electrode assembly (MEA), it is preferable to make the MEA after a post-process has been carried out on the polymer electrolyte membrane. A metal thin film is coated on the polymer electrolyte in order to, for example, further reduce fuel permeation, such as of methanol, in accordance with a preferred embodiment. As examples of such a metal thin film, palladium, platinum, silver and the like can be cited.

In a polymer electrolyte membrane of the present invention, the method for fabricating a membrane electrode assembly (MEA) using an electrode catalyst layer or an electrode catalyst layer and an electrode base is not particularly limited. It is preferable for the membrane electrode assembly to be integrated through hot pressing where appropriate temperature and pressure are selected in accordance with the thickness and the porosity of the polymer electrolyte membrane, the electrode catalyst layer and the electrode base. It is usually preferable for the temperature to be 40° C. to 180° C., and for the pressure to be 10 kgf/cm$^2$ to 80 kgf/cm$^2$.

A polymer electrolyte of the present invention can be applied to a variety of electrochemical apparatuses. Fuel cells, water electrolyzing apparatuses, chloralkali electrolyzing apparatuses and the like can be cited as examples, and from these, fuel cells are most preferable. Furthermore, from among fuel cells, a polymer electrolyte of the present invention is appropriate for polymer electrolyte fuel cells, which include those using hydrogen as fuel and those which use methanol as fuel, and a polymer electrolyte of the present invention is particularly preferable for direct type fuel cells which use methanol as fuel.

Furthermore, as for the applications of a polymer electrolyte fuel cell of the present invention, power sources for moveable bodies are preferable. In particular, they are preferably used as power sources for portable apparatuses, such as cellular phones, personal computers and PDA's (personal digital assistants), home electronics, such as vacuum cleaners, vehicles such as passenger cars, buses and trucks, and moveable bodies such as ships and trains.

Figure 1:
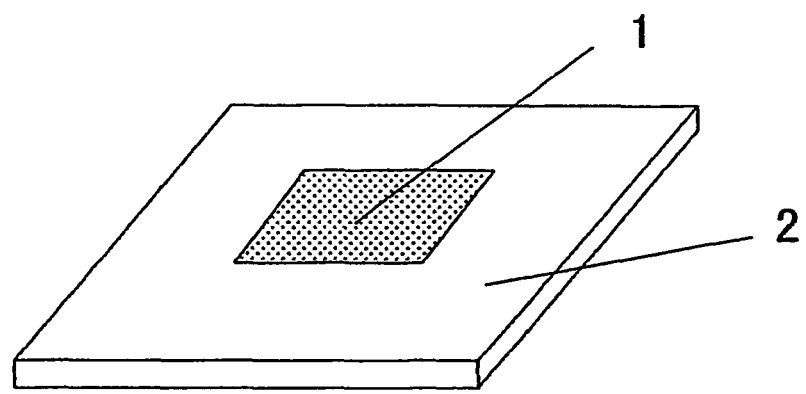
FIG. 1 is a schematic perspective diagram showing a polymer electrolyte according to the present invention.
Figure 2:
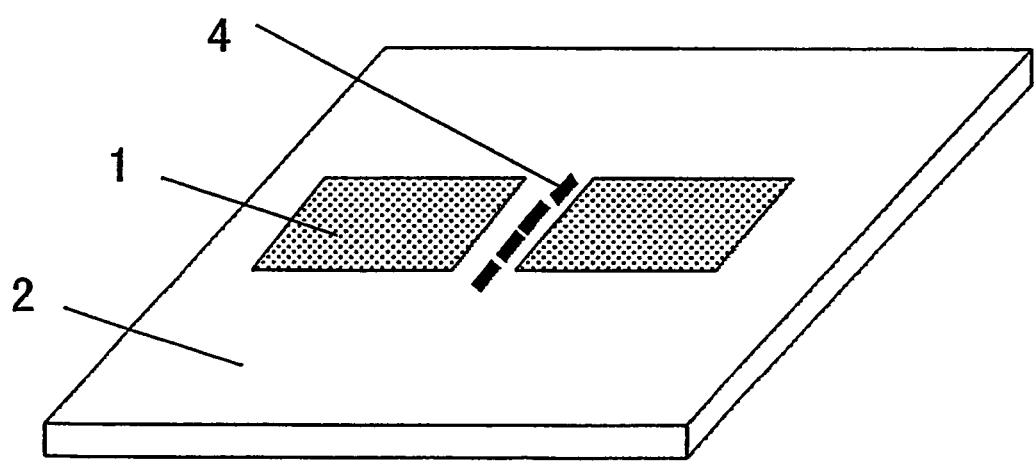
FIG. 2 is a schematic perspective diagram showing a polymer electrolyte having a side-by-side structure according to the present invention.
Figure 3:
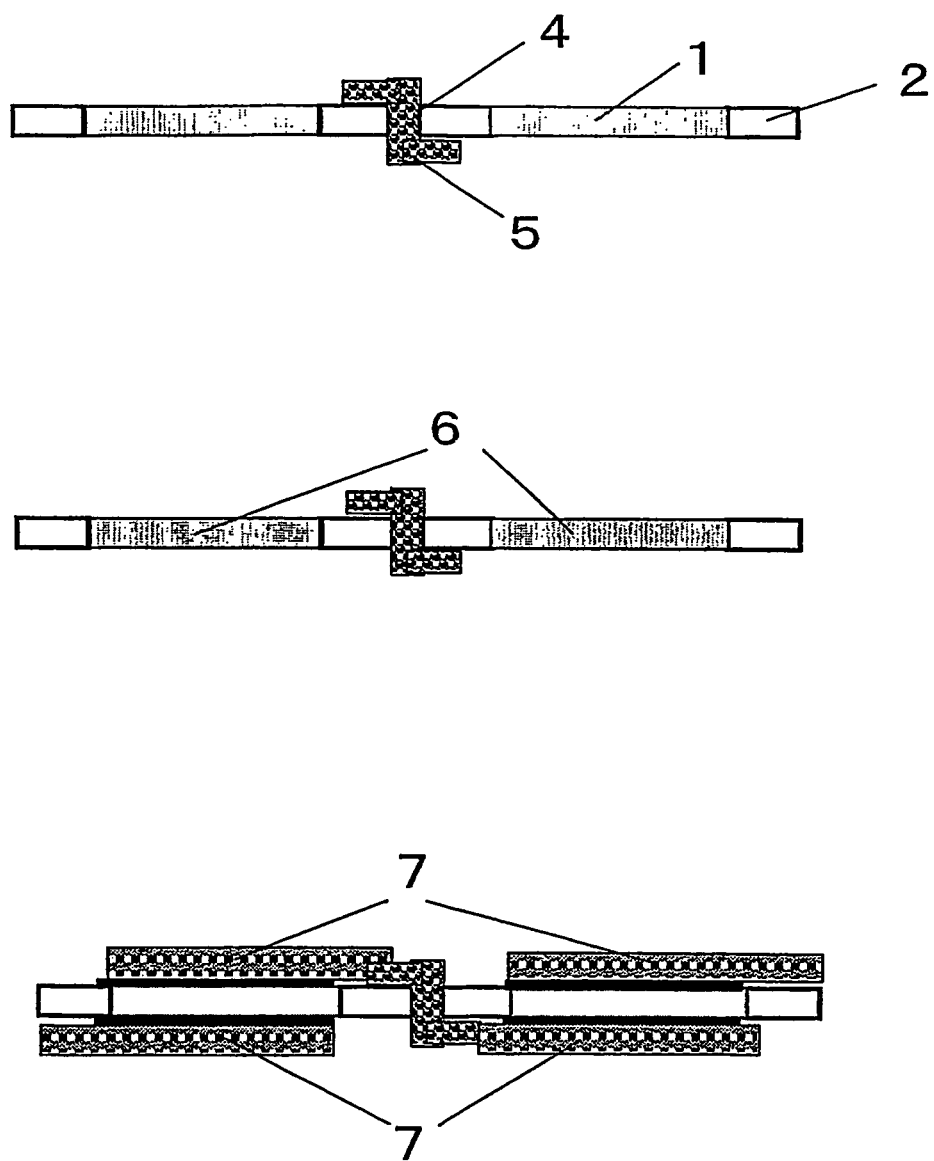
FIG. 3 is a schematic cross sectional diagram showing parts of the manufacturing process for a fuel cell having a side-by-side structure using a polymer electrolyte according to the present invention.

Here, the meaning of the symbols in the figures is as follows.

1: porous area
2: non-porous area
4: conductive area in membrane
5: membrane penetrating electron conductive area
6: proton conductive areas
7: electrodes
8: sample (polymer electrolyte membrane)
9: packing made of silicone rubber
10: stirrer
11: pure water
12: methanol solution

BEST MODE FOR CARRYING OUT THE INVENTION

In the following, the present invention is described in reference to the embodiments, and these examples are provided in order to better understand the present invention, and do not limit the present invention.

<Measuring Method and Test Method>

M1. Ratio of Amount of Unfreezable Water and Content of Unfreezable Water of Polymer Electrolyte The ratio of the amount of unfreezable water, represented by formula (S1) and the content of unfreezable water, represented by formula (S2), were found in accordance with a differential scanning calorimetry analysis (DSC) method. A polymer electrolyte was immersed in water at 20° C. for 12 hours, and after that, was taken out from the water, and excessive water that clung to the surface was removed by drying the surface with gauze as quickly as possible, and then, the polymer electrolyte was placed in a sealable type sample container made of aluminum with an alumina coating, of which the weight (Gp) had been measured in advance, which was then clamped shut, and after that, the total weight (Gw) of the sample and the sealable type sample container were measured as quickly as possible, and DSC measurement was immediately carried out. In accordance with the temperature measuring program, the polymer electrolyte was cooled from room temperature to −30° C. at a rate of 10° C./minute, and after that, the temperature was increased to 5° C. at a rate of 0.3° C./minute, and the amount of bulk water Wf was found from the DSC curve of this temperature raising process using the following formula (n1), the amount of low melting point water Wfc was found using formula (n2), and these were then subtracted from the total content of water, and thereby, the amount of unfreezable water Wnf was found [formula (n3)].

$$W_f = \int_{T_0}^{>T_0} \frac{\frac{dq}{dt}}{m\Delta H_0} dt \quad (n1)$$

$$W_{fC} = \int_{<T_0}^{T_0} \frac{\frac{dq}{dt}}{m\Delta H(T)} dt \quad (n2)$$

$$W_{nf} = W_t - W_f - W_{fC} \quad (n3)$$

Here, Wf, Wfc, Wnf and Wt were the weight of water per weight unit of a dried sample, m was the weight of the dried sample, dq/dt was the heat flux signal of the DSC, ΔH0 was the melting enthalpy at T0, and T0 was the melting point of bulk water. Here, a small hole was created in the sealable type sample container after the DSC measurement, and the inside was vacuum dried for 24 hours at 110° C. in a vacuum drier, and after that, the total weight (Gd) of the sample and the sealable type sample container was measured as soon as possible. The weight of the dried sample (m) was m=Gd−Gp. The total content of water (Wt) was Wt=(Gw−Gd)/m.

The apparatuses and the conditions for the DSC measurement were as follows.

DSC apparatus: "DSC Q100," made by TA Instruments Corporation

Data processing apparatus: "TRC-THADAP-DSC," made by Toray Research Center Inc.

Temperature range for measurement: −50° C. to 5° C.

Rate of scanning: 0.3° C./minute

Amount of sample: approximately 5 mg

Sample pan: sealable type sample container made of aluminum

Correction of temperature/calorie: melting point of water (0.0° C., calorie for melting: 79.7 cal/g)

Here, the present measurement was carried out in Toray Research Center Inc.

M2. Observation through Microscope

A polymer electrolyte was observed using an optical microscope and a transmission electron microscope so that the state of the phase separation was confirmed. In the case where the polymer electrolyte was observed by means of an optical microscope and the phase separation could not be confirmed, and in the case where 90 or more domain sizes of phase separations out of a randomly selected 100 were less than 100 μm, it was determined that (A) and (B) had been mixed with each other. In addition, in the case where the cross section of the polymer electrolyte was observed by means of an electron microscope and the phase separation could not be confirmed, and in the case where 90 or more domain sizes of phase separations but of a randomly selected 100 were less than 1 μm, it was determined that (A) and (B) had been substantially uniformly mixed with each other.

M3. Determination Whether or Not Polymer Electrolyte Included Cross Linking Polymer Whether or not a polymer electrolyte included a cross linking polymer was determined as follows. A polymer electrolyte (approximately 0.1 g) which was a test specimen was washed with pure water, and after that, was vacuumed dry for 24 hours at 40° C., and then, the weight was measured. The polymer electrolyte was immersed in a solvent which weighed 100 times greater, and the inside of a sealable container was stirred while being heated at 70° C. for 40 hours. Filtering was carried out using filter paper (No. 2) made by Advantec Corporation. The filter paper and the residue were washed during filtering with the same solvent that weighed 100 times greater so that the eluate was sufficiently eluted in the solvent. The filtered solution was exsiccated, and the weight of the eluate was found. In the case where the weight of the eluate was less than 95% of the initial weight, it was determined that this solvent included a substantially insoluble component. This test was carried out for five types of solvents, toluene, hexane, N-methyl pyrrolidone, methanol and water, and in the case where it was determined that all the solvents included a substantially insoluble component, it was determined that this polymer electrolyte included a cross linking polymer.

EXAMPLE 1

(1) Fabrication of Polymer Electrolyte Membrane

Sulfonated polyphenylene sulfide sulfone (density of sulfonic acid group: 2 mmol/g) was dissolved in N,N-dimethyl formamide (DMF) so as to gain a yellowish translucent solution having a concentration of 20% (M-A1). A 0.01 N-hydrochloric acid solution was added to 5 g of tetrabutoxy titanium made by Dow Corning Toray Co., Ltd., and was stirred for 30 minutes at room temperature so as to gain a colorless and transparent hydrolysate (M-B1). 10 g of (M-A1) was gathered, into which 0.5 g of (M-B1) was added. This liquid was impregnated to a polyimide base having independent collimated pores which had been fabricated in accordance with a photolithography for 10% of the ratio of the pore area and 12 μm of the diameter of the pores, and the base was heated at 100° C. for 30 minutes so that a polymer electrolyte membrane was fabricated. The thickness of the membrane was 15 μm. This polymer electrolyte was observed with an optical microscope and an electron microscope in accordance with the above described method of M2, and as a result, its phases were found to be substantially uniformly mixed. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 42%, and the content of unfreezable water in formula (S2) was 43%.

(2) Performance of Polymer Electrolyte Membrane

The amount of methanol permeating a polymer electrolyte membrane and proton conductivity were evaluated. A membrane was set in a cell made by ElectroChem Inc., and a 1 mol/l methanol solution was supplied to one surface at 0.2 ml/min and air was supplied to the other surface at 50 ml/min. The amount of methanol that had permeated was found by measuring the concentration of methanol in the exhausted air. The proton conductivity of the membrane was found by measuring the resistance of the membrane with the surface of which current and voltage terminals were made to make contact.

(3) Fabrication of Electrode

A treatment for water repellency was carried out on a carbon fiber cloth base using a suspension of 20% of polytetrafluoroethylene (PTFE), and after that, a carbon black dispersing liquid that included 20% of PTFE was applied, and an electrode base was fabricated through baking. An anode electrode catalyst coating liquid made of Pt—Ru carrying carbon and a Nafion solution was applied to an electrode base which had been fabricated in the above manner and was then dried so that an anode electrode was fabricated, and a cathode electrode catalyst coating liquid made of Pt carrying carbon and a Nafion solution was applied to an electrode base which had been fabricated in the above manner and was then dried so that a cathode electrode was fabricated.

(4) Fabrication and Evaluation of Membrane Electrode Assembly and Polymer Electrolyte Fuel Cell A polymer electrolyte membrane resulting from the above described process (2) was placed between an anode electrode and a cathode electrode which had been fabricated in the above described process (3), and thus, a membrane electrode assembly (MEA) was fabricated through the application of heat and pressure. This MEA was inserted into a cell made by ElectroChem Inc., and an MEA evaluation was carried out by making a 30% methanol solution flow on the anode side and making air flow on the cathode side. In the evaluation, a constant current was made to flow through the MEA and the voltage at this time was measured. The measurement was carried out until the voltage became no higher than 10 mV when the current was gradually increased. The product of the current and the voltage at each measured point became the output and the MEA, where a polymer electrolyte membrane of Example 1 was utilized, had excellent properties exhibiting values where the output (mW/cm$^2$) was 1.4 times higher and the energy capacity (Wh) was 1.9 times higher than those of the MEA (Comparison Example 1) where a Nafion 117 membrane was utilized.

COMPARATIVE EXAMPLE 1

A Nafion 117 membrane (made by DuPont) was used so as to fabricate an MEA in accordance with the method that is described in Example 1 (4). An evaluation was carried out in the same manner as Example 1 (4).

COMPARATIVE EXAMPLE 2

A polymer electrolyte membrane and an MEA were fabricated and evaluated in the same manner as Example 1 except for that hydrolysate of tetrabutoxy titanium was not added in Example 1. The MEA of the present Comparative Example 2 exhibited values where the output (mW/cm$^2$) was only 0.4 times lower than and the energy capacity (Wh) was 0.7 times lower than those of the MEA (Comparative Example 1) where a Nafion 117 membrane was utilized. This polymer electrolyte did not include a cross linking polymer as shown by the results determined in accordance with the above described method of M3. In addition, in accordance with the above described method of M1, the ratio of the amount of unfreezable water in formula (S1) was 22% and the content of unfreezable water in formula (S2) was 51%.

COMPARATIVE EXAMPLE 3

A polymer electrolyte membrane and an MEA were fabricated and evaluated in the same manner as in Example 1 except for that a 20% Nafion solution was utilized instead of the 20% DMF solution of sulfonated polyphenylene sulfide sulfone in Example 1. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 38% and the content of unfreezable water in formula (S2) was 15%. The MEA of the present Comparative Example 3 exhibited values where the output (mW/cm$^2$) was only 1.1 times higher and the energy capacity (Wh) was 1.1 times higher than those of the MEA (Comparative Example 1) where a Nafion 117 membrane was utilized.

EXAMPLE 2

A polymer electrolyte membrane and an MEA were fabricated and evaluated in the same manner as in Example 1 except for that a 20% DMF solution of phosphoric acid containing polyimide (density of phosphoric, acid group: 2 mmol/g) was utilized instead of the 20% DMF solution of sulfonated polyphenylene sulfide sulfone, and tetramethoxy silane was utilized instead of tetrabutoxy titanium in Example 1. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 60% and the content of unfreezable water in formula (S2) was 49%.

EXAMPLE 3

A polymer electrolyte membrane and an MEA were fabricated and evaluated in the same manner as in Example 1 except for that a 20% DMF solution of sulfonated poly diphenoxy phosphagen (density of sulfonic acid group: 1.5 mmol/g) was utilized instead of the 20% DMF solution of sulfonated polyphenylene sulfide sulfone, and the polyimide base was not utilized in Example 1. This polymer electrolyte was observed with an optical microscope and an electron microscope in accordance with the above, described method of M2, and as a result, it was found that its phases were substantially uniformly mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 49% and the content of unfreezable water in formula (S2) was 48%. The MEA of the present Example 3 exhibited values where the output (mW/cm$^2$) was 1.5 times higher and the energy capacity (Wh) was 1.9 times higher than those of the MEA (Comparative Example 1) where a Nafion 117 membrane was utilized.

EXAMPLE 4

A polymer electrolyte membrane and an MEA were fabricated and evaluated in the same manner as in Example 1 except for that a 20% DMF solution of phosphonic acid group containing polyphenylene sulfide (density of sulfonic acid group: 1 mmol/g) was utilized instead of the 20% DMF solution of sulfonated polyphenylene sulfide sulfone, and a porous base of polyvinylidene fluoride having a inter penetrated structure was utilized instead of the polyimide base in Example 1. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 41% and the content of unfreezable water in formula (S2) was 55%.

EXAMPLE 5

A polymer electrolyte membrane and an MEA were fabricated and evaluated in the same manner as in Example 1 except for that a 20% DMF solution of carboxylic acid group containing polyphenylene sulfide (density of carboxylic acid group: 1 mmol/g) was utilized instead of the 20% DMF solution of sulfonated polyphenylene sulfide sulfone, and tetraisopropyl bis(3-trimethoxy silyl propyl) methane bisphosphonate was utilized instead of tetrabutoxy titanium in Example 1. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, in accordance with the above described method of M1, the ratio of the amount of unfreezable water in formula (S1) was 40% and the content of unfreezable water in formula (S2) was 23%.

EXAMPLE 6

A polymer electrolyte membrane and an MEA were fabricated and evaluated in the same manner as in Example 5 except for that a 20% DMF solution of carboxylic acid group containing polyphenyl propylamide (density of carboxylic acid group: 1 mmol/g) was utilized instead of the 20% DMF solution of sulfonated polyphenylene sulfide sulfone in Example 5. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, in accordance with the above described method of M1, the ratio of the amount of unfreezable water in formula (S1) was 42% and the content of unfreezable water in formula (S2) was 43%.

EXAMPLE 7

A polymer electrolyte membrane and an MEA were fabricated and evaluated in the same manner as in Example 1 except for that 2 g of divinylbenzene and 0.02 g of azobisisobutyronitrile (AIBN) were added instead of tetrabutoxy titanium in Example 1. This polymer electrolyte was observed with an optical microscope and an electron microscope in accordance with the above described method of M2, and as a result, it was found that its phases were mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 43% and the content of unfreezable water in formula (S2) was 38%. The MEA of the present Example 7 exhibited values where the output ($mW/cm^2$) was 1.4 times higher and the energy capacity (Wh) was 1.7 times higher than those of the MEA (Comparative Example 1) where a Nafion 117 membrane was utilized.

EXAMPLE 8

A polymer electrolyte membrane and an MEA were fabricated and evaluated in the same manner as in Example 1 except for that sulfonated polysulfone (density of sulfonic acid group: 2 mmol/g) was utilized instead of the sulfonated polyphenylene sulfide sulfone in Example 1. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 45% and the content of unfreezable water in formula (S2) was 40%. The MEA of the present Example 8 exhibited values where the output ($mW/cm^2$) was 1.4 times higher and the energy capacity (Wh) was 1.7 times higher than those of the MEA (Comparative Example 1) where a Nafion 117 membrane was utilized.

EXAMPLE 9

A polymer electrolyte membrane and an MEA were fabricated and evaluated in the same manner as in Example 1 except for that 5 g of a sulfonated polyphenylene sulfide sulfone solution and 5 g of a sulfonated polysulfone (density of sulfonic acid group: 2 mmol/g) solution were utilized instead of 10 g of the sulfonated polyphenylene sulfide sulfone solution in Example 1. This polymer electrolyte was observed with an optical microscope and an electron microscope in accordance with the above described method of M2, and as a result, it was found that its phases were mixed with each other. In addition, this polymer electrolyte was determined in accordance with the above described method of M3, and a s a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 41% and the content of unfreezable water in formula (S2) was 37%. The MEA of the present Example 9 exhibited values where the output ($mW/cm^2$) was 1.8 times higher and the energy capacity (Wh) was 1.9 times higher than those of the MEA (Comparative Example 1) where a Nafion 117 membrane was utilized.

EXAMPLE 10

A polymer electrolyte membrane and an MEA were fabricated and evaluated in the same manner as in Example 1 except for that a 1:1 mixture of phenoxy trimethoxy silane and diphenoxy dimethoxy silane was utilized instead of the tetrabutoxy titanium in Example 1. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer. In addition, the insoluble material (cross linking polymer) in the test of M3 did not substantially have proton conductivity. In addition, in accordance with the above described method of M1, the ratio of the amount of unfreezable water in formula (S1) was 42% and the content of unfreezable water in formula (S2) was 44%. The MEA of the present Example 10 exhibited values where the output ($mW/cm^2$) was 1.6 times higher and the energy capacity (Wh) was 1.8 times higher than those of the MEA (Comparative Example 1) where a Nafion 117 membrane was utilized.

EXAMPLE 11

(1) Synthesis of Sulfonated Polyphenylene Oxide

Polyphenylene oxide (YPX-100L) (100 g) made by Mitsubishi Engineering-Plastics Corporation was dissolved in chloroform (1000 g) at room temperature under a nitrogen atmosphere and after that, the solution was stirred while chlorosulfonic acid (34 mL) was gradually dropped. After the completion of dropping, the solution was continued to be stirred for 30 minutes at room temperature. The deposited polymer was filtered and after that was crashed with a mill, and sufficiently washed with water and was then dried with a vacuum so that the target sulfonated polyphenylene oxide was gained (density of sulfonic acid: 3.0 mmol/g).

(2) Fabrication of Polymer Electrolyte Membrane

The sulfonated polyphenylene oxide that had been gained in the above described (1) was dissolved in N,N-dimethyl acetamide so that a 20 wt % solution (M-A2) was gained. Bisphenol A type epoxy resin "Epicoat 827" (0.5 g) made by Yuka Shell Epoxy Co., Ltd and (M-A2) (10 g) were mixed and stirred well. This liquid was cast onto a glass plate and was heated at 100° C. for 3 hours so that a polymer electrolyte membrane was fabricated. The thickness of the membrane was 80 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3 and as a result was found to include a cross linking polymer.

(3) Method for Measuring Proton Conductivity of Polymer Electrolyte Membrane

Electrochemical Measurement System HAG 5010(HZ-3000 50V 10 A Power Unit, HZ-3000 automatic polarization system) made by Hokuto Denko Corporation and Frequency Response Analyzer 5010 made by NF Corporation were utilized so as to measure impedance with a constant potential in accordance with a two terminal method and proton conductivity was found from the Nyquist diagram. The amplitude of the alternating current was 500 mV. As a sample, a membrane having a width of approximately 10 mm and a length of approximately 10 mm to 30 mm was used. The sample had been immersed in water just before the measurement. Platinum wires (two) having a diameter of 100 μm were utilized as electrodes. The electrodes were placed on the front and rear sides of the sample membrane so as to be parallel to each other and perpendicular to the longitudinal direction of the sample membrane.

In the same manner, proton conductivity of a Nafion 117 membrane (made by DuPont) was also measured.

(4) Method for Measuring Fuel Crossover of Polymer Electrolyte Membrane

Figure 4:
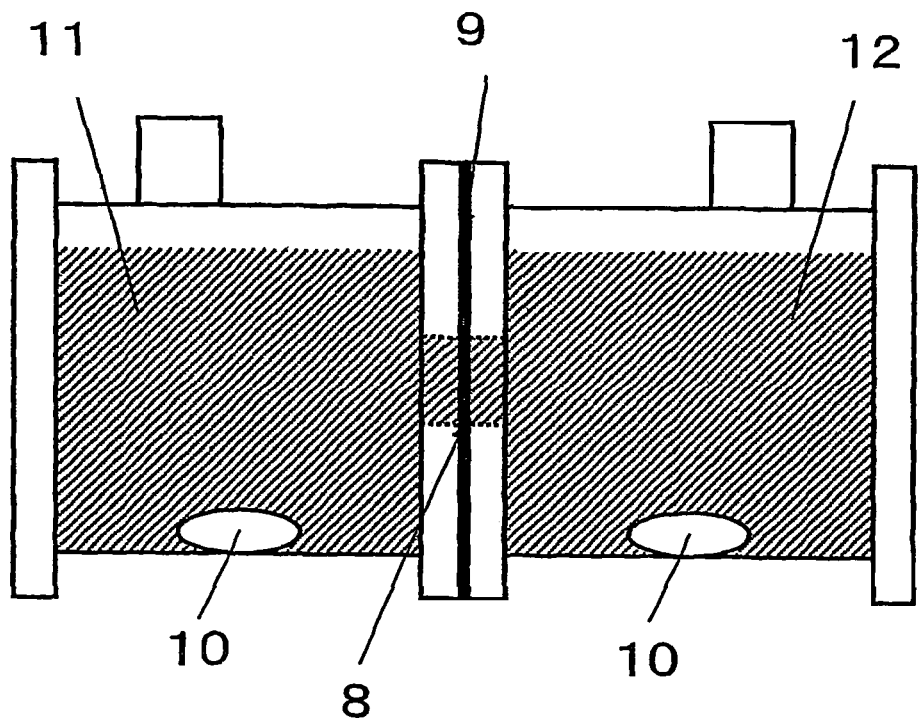
FIG. 4 is a schematic cross sectional diagram showing a cell for measuring the fuel crossover of a polymer electrolyte membrane.

A sample membrane was placed between cells as shown in FIG. 4, where pure water was placed in one cell and a 1 M methanol solution was placed in the other cell. The cells on both sides were stirred at 20° C. The amount of methanol that had been eluted in the pure water at the points in time where one hour, two hours and three hours elapsed was measured and quantitated by a gas chromatography (GC-2010) made by Shimadzu Corporation. The fuel crossover per unit hour/per unit area was found from the inclination of the graph.

In the same manner the fuel crossover of a Nafion 117 membrane (made by DuPont) per unit hour/per unit area was also measured.

(5) Ratio of Amount of Unfreezable Water and Content of Unfreezable Water

The ratio of the amount of unfreezable water and the content of unfreezable water were found in accordance with the above described method of M1.

(6) Performance of Polymer Electrolyte Membrane

Proton conductivity of the polymer electrolyte membrane that had been gained in the above described (2) was 0.085 S/cm, which was the same as the proton conductivity (0.085 S/cm) of the "Nafion" membrane.

In addition, the fuel crossover was 84 nmol/cm·minute, which was 0.70 times smaller than that of the Nafion 117 membrane, and thus, suppression of the fuel crossover was observed.

The ratio of the amount of unfreezable water was 61% and the content of unfreezable water was 52%. Here, the ratio of the amount of unfreezable water of Nafion 117 was 49% and the content of unfreezable water was 18%.

(7) Fabrication and Evaluation of Membrane Electrode Assembly

Using a polymer electrolyte membrane of the above described (2), a membrane electrode assembly (MEA) and a fuel cell were fabricated and evaluated in accordance with the method of Example 1 (4).

The MEA utilizing a polymer electrolyte membrane of the above described (2) had excellent properties exhibiting values where the output (mW/cm2) was 1.0 times higher and the energy capacity (Wh) was 1.3 times higher than those of the MEA (Comparative Example 1) that utilized Nafion 117.

EXAMPLE 12

(1) Fabrication of Polymer Electrolyte Membrane

A polymer electrolyte membrane was fabricated in the same manner as in Example 11 (2) except for that triphenol ethane type epoxy resin "Epicoat 1032H60" made by Yuka Shell Epoxy Co., Ltd was used instead of "Epicoat 827." The thickness of the membrane was 75 μm. This polymer electrode was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

(2) Performance of Polymer Electrolyte Membrane

Proton conductivity, the fuel crossover, the ratio of the amount of unfreezable water and the content of unfreezable water were measured in accordance with the methods of Example 11 (3) to (5). Proton conductivity of a polymer electrolyte membrane that had been gained in the above described (1) was 0.070 S/cm, which was approximately the same as the proton conductivity (0.085 S/cm) of the Nafion 117 membrane.

In addition, the fuel crossover was 60 nmol/cm·minute, which was 0.50 times lower than that of the Nafion 117 membrane, and thus suppression of the fuel crossover was observed.

The ratio of the amount of unfreezable water was 63% and the content of unfreezable water was 48%.

(3) Fabrication and Evaluation of Membrane Electrode Assembly

Using a polymer electrolyte membrane of the above described (1), a membrane electrode assembly (MEA) and a fuel cell were fabricated and evaluated in accordance with the method of Example 1 (4).

The MEA utilizing a polymer electrolyte membrane of the above described (1) had excellent properties exhibiting values where the output (mW/cm2) was 1.1 times higher and the energy capacity (Wh) was 1.4 times higher than those of the MEA (Comparative Example 1) that utilized Nafion 117.

EXAMPLE 13

(1) Synthesis of Sulfonated Polyether Ether Ketone

Polyether ether ketone (PEEK) made by Vitrex plc. (3.0 g) was dissolved in a concentrated sulfuric acid (150 ml) and the solution was stirred while the reaction was progressing as room temperature for four days. The gained mixture was placed into a large amount of ether and a white prescription was filtered and washed and then dried so as to gain sulfonated polyether ether ketone.

(2) Fabrication of Polymer Electrolyte Membrane

A polymer electrolyte membrane was fabricated in the same manner as in Example 11 (2) except for that sulfonated polyether ether ketone that had been gained in the above described (1) was used in place of sulfonated polyphenylene oxide. The thickness of the membrane was 75 μm. This polymer electrode was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

(3) Performance of Polymer Electrolyte Membrane

Proton conductivity, the fuel crossover, the ratio of the amount of unfreezable water and the content of unfreezable water were measured in accordance with the methods of Example 11 (3) to (5). Proton conductivity of a polymer electrolyte membrane that had been gained in the above described (1) was 0.080 S/cm, which was approximately the same as the proton conductivity (0.085 S/cm) of the Nafion 117 membrane.

In addition, the fuel crossover (78 nmol/cm·minute) was 0.65 times lower than that of the Nafion 117 membrane, and thus suppression of the fuel crossover was observed.

The ratio of the amount of unfreezable water was 41% and the content of unfreezable water was 45%.

(4) Fabrication and Evaluation of Membrane Electrode Assembly

Using a polymer electrolyte membrane of the above described (2), a membrane electrode assembly (MEA) and a fuel cell were fabricated and evaluated in accordance with the method of Example 1 (4).

The MEA utilizing a polymer electrolyte membrane of the above described (2) had excellent properties exhibiting values where the output (mW/cm$^2$) was 1.1 times higher and the energy capacity (Wh) was 1.4 times higher than those of the MEA (Comparative Example 1) that utilized Nafion 117.

EXAMPLE 14

(1) Fabrication of Polymer Electrolyte Membrane

A polymer electrolyte membrane was fabricated in the same manner as in Example 11 (2) except for that bisphenoxy ethanol fluorene type epoxy resin "BPEFG" made by Osaka Gas Co., Ltd. was used instead of "Epicoat 827." The thickness of the membrane was 75 μm. This polymer electrode was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

(2) Performance of Polymer Electrolyte Membrane

Proton conductivity, the fuel crossover, the ratio of the amount of unfreezable water and the content of unfreezable water were measured in accordance with the methods of Example 11 (3) to (5). Proton conductivity of a polymer electrolyte membrane that had been gained in the above described (1) was 0.075 S/cm, which was approximately the same as the proton conductivity (0.085 S/cm) of the Nafion 117 membrane.

In addition, the fuel crossover (78 nmol/cm·minute) was 0.65 times lower than that of the Nafion 117 membrane, and thus suppression of the fuel crossover was observed.

The ratio of the amount of unfreezable water was 58% and the content of unfreezable water was 49%.

(3) Fabrication and Evaluation of Membrane Electrode Assembly

Using a polymer electrolyte membrane of the above described (1), a membrane electrode assembly (MEA) and a fuel cell were fabricated and evaluated in accordance with the method of Example 1 (4).

The MEA utilizing a polymer electrolyte membrane of the above described (1) had excellent properties exhibiting values where the output (mW/cm2) was 1.2 times higher and the energy capacity (Wh) was 1.4 times higher than those of the MEA (Comparative Example 1) that utilized Nafion 117.

EXAMPLE 15

(1) Fabrication of Polymer Electrolyte Membrane

A polymer electrolyte membrane was fabricated in the same manner as in Example 11 (2) except for that a mixture of 1,6-hexanediisocyanate (0.15 g), polypropylene glycol (molecular weight: 1000) (0.30 g) and glycerine (0.05 g) was used instead of "Epicoat 827." The thickness of the membrane was 80 μm. This polymer electrode was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

(2) Performance of Polymer Electrolyte Membrane

Proton conductivity, the fuel crossover, the ratio of the amount of unfreezable water and the content of unfreezable water were measured in accordance with the methods of Example 11 (3) to (5). Proton conductivity of a polymer electrolyte membrane that had been gained in the above described (1) was 0.075 S/cm, which was approximately the same as the proton conductivity (0.085 S/cm) of the Nafion 117 membrane.

In addition, the fuel crossover (72 nmol/cm·minute) was 0.60 times lower than that of the Nafion 117 membrane, and thus suppression of the fuel crossover was observed.

The ratio of the amount of unfreezable water was 55% and the content of unfreezable water was 40%.

(3) Fabrication and Evaluation of Membrane Electrode Assembly

Using a polymer electrolyte membrane of the above described (1), a membrane electrode assembly (MEA) and a fuel cell were fabricated and evaluated in accordance with the method of Example 1 (4).

The MEA utilizing a polymer electrolyte membrane of the above described (1) had excellent properties exhibiting values where the output (mW/cm$^2$) was 1.2 times higher and the energy capacity (Wh) was 1.5 times higher than those of the MEA (Comparative Example 1) that utilized Nafion 117.

EXAMPLE 16 result, it was found that its phases were substantially uniformly mixed with each other. In addition, this polymer electrolyte was determined in accordance with the above described method of M3, and as a result was found to include a cross linking polymer.

(3) Performance of Polymer Electrolyte Membrane

Measurements were carried out in accordance with the methods of Example 11 (3) to (5). Proton conductivity of the polymer electrotype membrane that had been gained in the above described (1) was 0.090 S/cm, which was approximately the same as the proton conductivity (0.085 S/cm) of the Nafion 117 membrane.

In addition, the fuel crossover (26 nmol/cm·minute) was 0.22 times lower than that of the Nafion 117 membrane, and suppression of the fuel crossover was great.

The ration of the amount of unfreezable water was 86% and the content of unfreezable water was 50%, indicating that the ratio of unfreezable water was extremely large.

(4) Fabrication and Evaluation of Membrane Electrode Assembly

Using a polymer electrolyte membrane of the above described (2), a membrane electrode assembly (MEA) and a fuel cell were fabricated and evaluated in accordance with the method of Example 1 (4).

(1) Fabrication of Proton Conductive Polymer

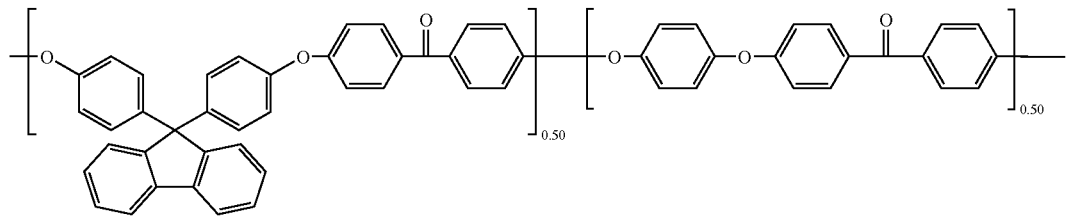

(T1)

35 g of potassium carbonate, 11 g of hydroquinone, 35 g of 4,4'-(9H-fluorene-9-ylidene) bisphenol and 44 g of 4,4'-difluorol benzophenon were used so as to carry out polymerization in N-methyl pyrrolidone (NMP) at 160° C. After the extraction with water, precipitation was gained again with a large amount of methanol, and thus, refinement was carried out and a polymer represented by the above described formula (T1) was gained in a quantitative manner.

10 g of the above described polymer was dissolved in chloroform at room temperature under a nitrogen atmosphere, and after that the solution was vigorously stirred while 14 mL of chlorosulfonic acid was gradually dropped into the solution so that the reaction was progressed for five minutes. White precipitation was filtered, crashed and sufficiently washed with water, and then dried so as to gain the target proton conductive polymer. The density of a sulfonic acid group of the gained proton conductive polymer was found through element analysis to be 2.6 mmol/g.

(2) Fabrication of Polymer Electrolyte Membrane

The proton conductive polymer that had been gained in the above described (1) was dissolved in N,N-dimethyl acid amide so that a 20 wt % solution was gained. This solution (10 g) and bisphenol A type epoxy resin "Epicoat 827" made by Yuka Shell Epoxy Co., Ltd (0.5 g) were mixed with each other and stirred well. This liquid was cast onto a glass plate and was heated at 100° C. for three hours so that a polymer electrolyte membrane was fabricated. The thickness of the membrane was 240 µm. This polymer electrode was observed with an optical microscope and an electron microscope in accordance with the above described method of M2, and as a The MEA utilizing a polymer electrolyte membrane of the above described (2) had excellent properties exhibiting values where the output (mW/cm$^2$) was 1.9 times higher and the energy capacity (Wh) was 2.9 times higher than those of the MEA (Comparative Example 1) that utilized Nafion 117.

EXAMPLE 17

(1) Hydrolysis of Titanium Alkoxide 0.01 N hydrochloric acid solution was added to 5 g of tetrabutoxy titanium made by Dow Corning Toray Co., Ltd. and the solution was stirred for 30 minutes at room temperature so that colorless and transparent hydrolysate was gained.

(2) Manufacture of Polymer Electrolyte 0.5 g of the hydrolysate that had been fabricated in (1) was added to 10 g of a 20% solution of sodium polystyrene sulfonate (Aldrich Corporation). This solution was cast onto a glass plate and was heated at 100° C. for 30 minutes so that a polymer electrolyte member was gained. Ion exchange was carried out on this polymer electrolyte membrane in a 1 M hydrochloric acid solution and after that the membrane was sufficiently washed with pure water. This polymer electrolyte was observed with an optical microscope and, an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

(3) Performance of Polymer Electrolyte Membrane

Measurements were carried out in accordance with the methods of Example 11 (3) to (5). Proton conductivity of the polymer electrotype membrane that had been gained in the above described (1) was 0.13 S/cm.

In addition, the fuel crossover (96 nmol/cm·minute) was 0.80 times lower than that of the Nafion 117 membrane, and suppression of the fuel crossover was great.

The ration of the amount of unfreezable water was 68% and the content of unfreezable water was 58%.

(4) Fabrication and Evaluation of Membrane Electrode Assembly

Using a polymer electrolyte membrane of the above described (2), a membrane electrode assembly (MEA) and a fuel cell were fabricated and evaluated in accordance with the method of Example 1 (4).

The MEA utilizing a polymer electrolyte membrane of the above described (2) had excellent properties exhibiting values where the output (mW/cm$^2$) was 1.2 times higher and the energy capacity (Wh) was 1.2 times higher than those of the MEA (Comparative Example 1) that utilized Nafion 117.

EXAMPLE 18

(1) Fabrication of Polymer Electrolyte and Evaluation of Membrane Performance

A polymer electrolyte membrane was fabricated in the same manner as in Example 17 except for that tetramethoxy silane was used instead of tetrabutoxy titanium. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer. When the performance of this membrane was evaluated in the same manner as in Example 17 (3), proton conductivity was 0.13 S/cm.

In addition, the fuel crossover was 0.76 times (91 nmol/cm·minute) of that of the Nafion 117 membrane, and thus, the fuel crossover was suppressed.

The ratio of the amount of unfreezable water was 59% and the content of unfreezable water was 54%.

EXAMPLE 19

(1) Fabrication of Polymer Electrolyte and Evaluation of Membrane Performance

A polymer electrolyte membrane was fabricated in the same manner as in Example 17 except for that a 1:1 (weight ratio) mixed solution of phenyltrimethoxy silane and diphenyl trimethoxy silane was used instead of tetrabutoxy titanium. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer. When the performance of this membrane was evaluated in the same manner as in Example 17 (3), proton conductivity was 0.13 S/cm.

In addition, the fuel crossover was 0.75 times (90 nmol/cm·minute) of that of the Nafion 117 membrane, and thus, the fuel crossover was suppressed.

The ratio of the amount of unfreezable water was 66% and the content of unfreezable water was 55%.

EXAMPLE 20

(1) Fabrication of Polymer Electrolyte and Evaluation of Membrane Performance

A polymer electrolyte membrane was fabricated in the same manner as in Example 17 except for that a 20% sulfonated polyphenylene sulfide sulfone solution was utilized instead of a sodium polystyrene sulfonate solution and a polyimide base that had been fabricated through photolithography so as to have a ratio of the pore area of 10% and a diameter of pores of 12 μm was filled in with the polymer electrolyte. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

When the performance of this membrane was evaluated in the same manner as in Example 17 (3), proton conductivity was 0.080 S/cm.

In addition, the fuel crossover was 0.62 times (74 nmol/cm·minute) of that of the Nafion 117 membrane, and thus, the fuel crossover was suppressed.

EXAMPLE 21

(1) Fabrication of Polymer Electrolyte and Evaluation of Membrane Performance

A polymer electrolyte was gained in the same manner as in Example 17 except for that tetramethoxy zirconium was utilized instead of tetrabutoxy titanium. This polymer electrolyte was observed with an optical microscope and an electron microscope in accordance With the above described method of M2, and as a result, it was found that its phases were substantially uniformly mixed with each other. In addition, this polymer electrolyte was determined in accordance with the above described method of M3, and as a result was found to include a cross linking polymer.

When the performance of this membrane was evaluated in the same manner as in Example 17 (3), proton conductivity was 0.115 S/cm.

In addition, the fuel crossover was 0.92 times (110 nmol/cm·minute) of that of the Nafion 117 membrane, and thus, the fuel crossover was suppressed.

The ratio of the amount of unfreezable water was 52% and the content of unfreezable water was 43%.

EXAMPLE 22

(1) Fabrication of Polymer Electrolyte and Evaluation of Membrane Performance

A polymer electrolyte was gained in the same manner as in Example 20 except for that triethoxy phosphorus was utilized instead of phenyl trimethoxy silane, and a PVDF porous base having a ratio of the pore area of 10%, a diameter of pores on the surface of 1 μm and an inter penetrated structure was filled in with the polymer electrolyte. This polymer electrolyte was observed with an optical microscope and an electron microscope in accordance with the above described method of M2, and as a result, it was found that its phases were substantially uniformly, mixed with each other. In addition, this polymer electrolyte was determined in accordance with the above described method of M3, and as a result was found to include a cross linking polymer.

When the performance of this membrane was evaluated in the same manner as in Example 17 (3), proton conductivity was 0.095 S/cm.

In addition, the fuel crossover was 0.83 times (100 nmol/cm·minute) of that of the Nafion 117 membrane, and thus, the fuel crossover was suppressed.

The ratio of the amount of unfreezable water was 68% and the content of unfreezable water was 58%.

EXAMPLE 23

(1) Fabrication of Polymer Electrolyte and Evaluation of Membrane Performance

A polymer electrolyte was gained in the same manner as in Example 17 except for that tetraisopropyl bis(3-trimethoxy silyl propyl) methane bisphosphonate was used instead of tetrabutoxy titanium. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

When the performance of this membrane was evaluated in the same manner as in Example 17 (3), proton conductivity was 0.12 S/cm.

In addition, the fuel crossover was 0.7 times (84 nmol/cm·minute) of that of the Nafion 117 membrane, and thus, the fuel crossover was suppressed.

The ratio of the amount of unfreezable water was 43% and the content of unfreezable water was 43%.

EXAMPLE 24

(1) Fabrication of Polymer Electrolyte and Evaluation of Membrane Performance

A polymer electrolyte was gained in the same manner as in Example 23 except for that the added amount of the hydrolysate of tetraisopropyl bis(3-trimethoxy silyl propyl) methane bisphosphonate was 3 g. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result was found to include a cross linking polymer.

When the performance of this membrane was evaluated in the same manner as in Example 17 (3), proton conductivity was 0.10 S/cm.

In addition, the fuel crossover was 0.6 times (72 nmol/cm·minute) of that of the Nafion 117 membrane, and thus, the fuel crossover was suppressed.

The ratio of the amount of unfreezable water was 41% and the content of unfreezable water was 45%.

EXAMPLE 25

(1) Synthesis of Sulfonated Polyphenylene Oxide

Sulfonated polyphenylene oxide was synthesized in the same manner as in Example 11 (1).

This sulfonated polyphenylene oxide was dissolved in N,N-dimethyl acetamide (DMAc) so that a 20 wt % solution was gained.

(2) Synthesis of Trimethylsilyl 4-Pentenoate 4-pentenoic acid (Tokyo Kasei Kogyo Co., Ltd., 48.48 g) was placed in a 200 mL flask with 3 openings having a circulated cooling line, a stirring apparatus and a nitrogen gas guide pipe. The flask was immersed in an ice bath, and hexamethyl disilazane (39.08 g, 0.242 mol) was dropped while a nitrogen gas was introduced and the solution was stirred. A white crystal deposited and the entirety became a sherbet-like form. The solution was stirred and a nitrogen gas was introduced so as to expel an ammonium gas, and then, the reaction was progressed at 100° C. for approximately 6 hours. The crystal in the reacting liquid dissolved and was converted to a colorless and transparent solution. Refinement was carried out through distillation under reduced pressure, and trimethylsilyl 4-pentenoate (70.9 g) was gained as a colorless and transparent liquid (purity by measure of gas chromatography: 96.8%).

(3) Synthesis of Trimethylsilyl 5-Trimethoxysilyl Pentanoate

Trimethoxy silane (Tokyo Kasei Kogyo Co., Ltd., 35.50 g) was placed in a 300 mL flask with three openings having a dropping funnel and stirring blades. Furthermore, a solution where platinum chloride hexahydrate (Wako Pure Chemical Industries, Ltd., 7.3 mg) had been dissolved in 2-propanol (0.2 mL) was added. Trimethylsilyl 4-pentenoate (50.06 g) was placed in the dropping funnel and was dropped while being stirred at room temperature. On the way, generation of heat was observed and, therefore, the flask with three openings was immersed in an ice bath so as to be cooled. The flask was left as is for one night after returning to room temperature. Refinement was carried out through distillation under reduced pressure, and thereby, trimethylsilyl 5-trimethoxysilyl pentanoate (32.2 g) was gained as a colorless and transparent liquid (purity by measure of gas, chromatography: 96.8%).

(4) Hydrolysis of Silane Compound (4a) A 1 M hydrochloric acid solution (0.68 g) was added to 1,6-bis(trimethoxy silyl) hexane (1.35 g) made by Gelest Inc., which was stirred for 30 minutes at room temperature, and thereby, a colorless and transparent hydrolysate was gained.

(4b) A 1 M hydrochloric acid solution (0.37 g) was added to trimethylsilyl 5-trimethoxysilyl pentanoate (1.0 g) that had been gained in the above described (3) at 0° C., which was stirred for 30 minutes at room temperature, and thereby, a colorless and transparent hydrolysate was gained.

(5) Fabrication of Polymer Electrolyte Membrane

The hydrolysate of the above described (4a) and (4b) and a sulfonated polyphenylene oxide DMAc solution (19.5 g) were mixed. This liquid was cast onto a glass plate and was heated at 100° C. for three hours, and thus, a polymer electrolyte membrane was fabricated. The thickness of the membrane was 180 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(6) Performance Evaluation of Polymer Electrolyte Membrane

When the performance of this membrane was evaluated in the same manner as in Example 17 (3), proton conductivity was 80 mS/cm.

In addition, the fuel crossover (78 nmol/cm·minute) was 0.65 times lower than that of the Nafion 117 membrane, and the fuel crossover was suppressed.

The ratio of the amount of unfreezable water was 68% and the content of unfreezable water was 56%.

(7) Fabrication and Evaluation of Membrane Electrode Assembly

A membrane electrode assembly (MEA) and a fuel cell were fabricated and evaluated using a polymer electrolyte membrane of the above described (5) in accordance with the method of Example 1 (4).

The MEA that utilized a polymer electrolyte membrane of the above described (5) had excellent properties exhibiting values where the output (mW/cm$^2$) was 1.1 times greater and the energy capacity (Wh) was 1.8 times greater than those of the MEA (Comparative Example 1) that utilized Nafion 117.

EXAMPLE 26

(1) Synthesis of Trimethylsilyl 3-Butenate 3-butenoic acid (Aldrich, 50.0 g) was placed in a 200 mL flask with three openings having a circulated cooling line, a stirring apparatus and a nitrogen gas guide pipe. The flask was immersed in an ice bath, and hexamethyl disilazane (46.9 g) was dropped while a nitrogen gas was introduced and the solution was stirred. A white crystal deposited and the entirety became a sherbet-like form. The solution was stirred and a nitrogen gas was introduced so as to expel an ammonium gas, and then, the reaction was progressed at 100° C. for approximately 5 hours. Most of the crystal in the reacting liquid dissolved and was converted to a brownish and translucent solution. Refinement was carried out through distillation under, reduced pressure. A slight amount of white crystal was mixed in the distilland, and therefore, this was removed through filtration under pressure (PTFE filter, diameter of pores: 0.1 μm). Trimethylsilyl 3-butenate (67.8 g) was gained as a colorlesss and transparent liquid (purity by measure of gas chromatography: 95.1%).

(2) Synthesis of Trimethylsilyl 4-Trimethoxysilyl Butanate

Trimethylsilyl 3-butenate (50.0 g) was placed in a 300 mL flask with three openings having a dropping funnel and stirring blades. Furthermore, absolution where platinum chloride hexahydrate (Wako Pure Chemical Industries, Ltd., 17 mg) was dissolved in 2-propanol (0.4 mL) was added. Trimethoxy silane (38.8 g) was placed the dropping funnel. The flask with three openings was immersed in an ice bath so as to be cooled and dropping was carried out over approximately 20 minutes while the solution was stirred. After that, the flask was left as is over night at room temperature. Refinement was carried out through distillation under reduced pressure, and trimethylsilyl 4-trimethoxysilyl butanate (47.3 g) was gained as a colorless and transparent liquid (purity by measure of gas chromatography: 87.1%).

(3) Hydrolysis of Silane Compound (3a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(3b) A 1 M hydrochloric acid solution (0.40 g) was added to trimethylsilyl 5-trimethoxysilyl butanate (1.0 g) at 0° C., which was stirred for 30 minutes at room temperature so that colorless and transparent hydrolysate was gained.

(4) Fabrication of Polymer Electrolyte Membrane

The hydrolysate of the above described (3a) and (3b) and a sulfonated polyphenylene oxide DMAc solution (19.5 g) of Example 12 (1) were mixed. This liquid was cast onto a glass plate and was heated at 100° C. for three hours, and thus, a polymer electrolyte membrane was fabricated. The thickness of the membrane was 180 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(5) Performance Evaluation of Polymer Electrolyte Membrane

When the performance of this membrane was evaluated in the same manner as in Example 17 (3), proton conductivity was 79 mS/cm, which was approximately the same as that of Nafion 117.

In addition, the fuel crossover (85 nmol/cm·minute) was 0.71 times lower than that of the Nafion 117 membrane, and the fuel crossover was suppressed.

The ratio of the amount of unfreezable water was 47% and the content of unfreezable water was 50%.

(6) Fabrication and Evaluation of Membrane Electrode Assembly

A membrane electrode assembly (MEA) and a fuel cell were fabricated and evaluated using a polymer electrolyte membrane of the above described (4) in accordance with the method of Example 1 (4).

The MEA that utilized a polymer electrolyte membrane of the above described (4) had excellent properties exhibiting values. where the output (mW/cm$^2$) was 1.1 times greater and the energy capacity (Wh) was 1.9 times greater than those of the MEA (Comparative Example 1) that utilized Nafion 117.

EXAMPLE 27

(1) Hydrolysis of Silane Compound (1a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(1b) A 1 M hydrochloric acid solution (0.40 g) was added to a compound (made by Azmax Co., 1.0 g) represented by formula (K1) at 0° C., which was stirred for 30 minutes at room temperature so that colorless and transparent hydrolysate was gained.

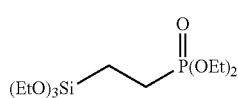

(K1)

(2) Fabrication of Polymer Electrolyte Membrane

The hydrolysate of the above described (1a) and (1b) and a sulfonated polyphenylene oxide DMAc solution (19.5 g) of Example 12 (1) were mixed. This liquid was cast onto a glass plate and was heated at 100° C. for three hours, and thus, a polymer electrolyte membrane was fabricated. The thickness of the membrane was 185 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(3) Performance Evaluation of Polymer Electrolyte Membrane

When the performance of this membrane was evaluated in the same manner as in Example 17 (3), proton conductivity was 76 mS/cm.

In addition, the fuel crossover (78 nmol/cm·minute) was 0.65 times lower than that of the Nafion 117 membrane, and the fuel crossover was suppressed.

The ratio of the amount of unfreezable water was 53% and the content of unfreezable water was 52%.

(4) Fabrication and Evaluation of Membrane Electrode Assembly

A membrane electrode assembly (MEA) and a fuel cell were fabricated and evaluated using a polymer electrolyte membrane of the above described (2) in accordance with the method of Example 1 (4).

The MEA that utilized a polymer electrolyte membrane of the above described (2) had excellent properties exhibiting values where the output (mW/cm$^2$) was 1.1 times greater and the energy capacity (Wh) was 1.8 times greater than those of the MEA (Comparative Example 1) that utilized Nafion 117.

EXAMPLE 28

(1) Hydrolysis of Silane Compound (1a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(1b) A 1 M hydrochloric acid solution (0.24 g) was added to a solution made of a compound (made by Gelest Inc., 0.74 g) represented by formula (K2) and DMAc (0.74 g) at 0° C., which was stirred for 30 minutes at room temperature so that colorless and transparent hydrolysate was gained.

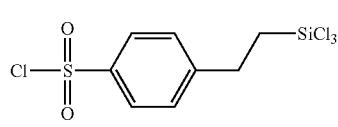
(K2)

(2) Fabrication of Polymer Electrolyte Membrane

The hydrolysate of the above described (1a) and (1b) and a sulfonated polyphenylene oxide DMAc solution (19.5 g) of Example 12 (1) were mixed. This liquid was cast onto a glass plate and was heated at 100° C. for three hours, and thus, a polymer electrolyte membrane was fabricated. The thickness of the membrane was 195 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(3) Performance Evaluation of Polymer Electrolyte Membrane

When the performance of this membrane was evaluated in the same manner as in Example 17 (3), proton conductivity was 87 mS/cm.

In addition, the fuel crossover (96 nmol/cm·minute) was 0.80 times lower than that of the Nafion 117 membrane, and the fuel crossover was suppressed.

The ratio of the amount of unfreezable water was 54% and the content of unfreezable water was 54%.

(4) Fabrication and Evaluation of Membrane Electrode Assembly

A membrane electrode assembly (MEA) and a fuel cell were fabricated and evaluated using a polymer electrolyte membrane of the above described (2) in accordance with the method of Example 1 (4).

The MEA that utilized a polymer electrolyte membrane of the above described (2) had excellent properties exhibiting values where the output (mW/cm2) was 1.1 times greater and the energy capacity (Wh) was 1.4 times greater than those of the MEA (Comparative Example 1) that utilized Nafion 117.

EXAMPLE 29

(1) Synthesis of Sulfonated Polyether Ether Ketone

Polyether ether ketone (PEEK) made by Vitrex plc. (3.0 g) was dissolved in a concentrated sulfuric acid (150 ml) and the reaction was progressed for 4 days at room temperature while the solution was stirred. The gained mixture was placed in a large amount of ether and a white precipitation was filtered and washed and then dried so that sulfonated polyether ether ketone was gained. This sulfonated polyether ether ketone was dissolved in DMAc and a 20 wt % solution was gained.

(2) Hydrolysis of Silane Compound (2a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(2b) A 1 M hydrochloric acid solution (0.24 g) was added to a solution made of a compound (made by Gelest Inc., 0.80 g) represented by formula (K3) and DMAc (0.80 g) at 0° C., which was stirred for 30 minutes at room temperature so that colorless, and transparent hydrolysate was gained.

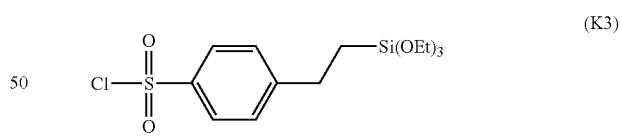
(K3)

(3) Fabrication of Polymer Electrolyte Membrane

The hydrolysate of the above described (2a) and (2b) and a sulfonated polyether ether ketone DMAc solution, (19.5 g) of the above described (1) were mixed. This liquid was cast onto a glass plate and was heated at 100° C. for three hours, and thus, a polymer electrolyte membrane was fabricated. The thickness of the membrane was 204 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(4) Performance Evaluation of Polymer Electrolyte Membrane

When the performance of this membrane was evaluated in the same manner as in Example 17 (3), proton conductivity was 77 mS/cm, which was approximately the same as that of Nafion 117.

In addition, the fuel crossover (97 nmol/cm·minute) was 0.81 times lower than that of the Nafion 117 membrane, and the fuel crossover was suppressed.

The ratio of the amount of unfreezable water was 48% and the content of unfreezable water was 51%.

(5) Fabrication and Evaluation of Membrane Electrode Assembly

A membrane electrode assembly (MEA) and a fuel cell were fabricated and evaluated using a polymer electrolyte membrane of the above described (3) in accordance with the method of Example 1 (4).

The MEA that utilized a polymer electrolyte membrane of the above described (3) had excellent properties exhibiting values where the output (mW/cm$^2$) was 1.1 times greater and the energy capacity (Wh) was 1.3 times greater than those of the MEA (Comparative Example 1) that utilized Nafion 117.

EXAMPLE 30

(1) Hydrolysis of Silane Compound (1a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(1b) A 1 M hydrochloric acid solution (0.32 g) was added at 0° C. to a solution that had been synthesized from 3-triethoxy silyl propane sulfonyl chloride (0.97 g) and diethylene glycol dimethyl ether (0.97 g) in accordance with the method described in Electrochimica Acta, Vol. 45, 1377-1383 (2000), which was stirred for 30 minutes at room temperature so that colorless and transparent hydrolysate was gained.

(2) Fabrication of Polymer Electrolyte Membrane

The hydrolysate of the above described (1a) and (1b) and a sulfonated polyphenylene oxide DMAc solution (19.5 g) of Example 12 (1) were mixed. This liquid was cast onto a glass plate and was heated at 100° C. for three hours, and thus, a polymer electrolyte membrane was fabricated. The thickness of the membrane was 195 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(3) Performance Evaluation of Polymer Electrolyte Membrane

When the performance of this membrane was evaluated in the same manner as in Example 17 (3), proton conductivity was 88 mS/cm, which was approximately the same as that of Nafion 117.

In addition, the fuel crossover (102 nmol/cm·minute) was 0.85 times lower than that of the Nafion 117 membrane, and the fuel crossover was suppressed.

The ratio of the amount of unfreezable water was 44% and the content of unfreezable water was 56%.

(4) Fabrication and Evaluation of Membrane Electrode Assembly

A membrane electrode assembly (MEA) and a fuel cell were fabricated and evaluated using a polymer electrolyte membrane of the above described (2) in accordance with the method of Example 1 (4).

The MEA that utilized a polymer electrolyte membrane of the above described (2) had excellent properties exhibiting values where the output (mW/cm$^2$) was 1.1 times greater and the energy capacity (Wh) was 1.2 times greater than those of the MEA (Comparative Example 1) that utilized Nafion 117.

EXAMPLE 31

(1) Hydrolysis of Silane Compound (1a) A 1 M hydrochloric acid solution (0.37 g) was added to bis(3-triethoxy silyl propyl) urea made by Gelest Inc. (2.47 g) at 0° C., which was stirred for 30 minutes at room temperature so that colorless and transparent hydrolysate was gained.

(1b) A 1 M hydrochloric acid solution (0.24 g) was added to a solution made of a compound (made by Gelest Inc., 0.74 g) represented by formula (K2) and DMAc (0.74 g) at 0° C., which was stirred for 30 minutes at room temperature so that colorless and transparent hydrolysate was gained.

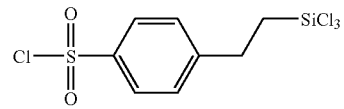

(K2)

(2) Fabrication of Polymer Electrolyte Membrane

The hydrolysate of the above described (1a) and (1b) and a sulfonated polyphenylene oxide DMAc solution, (19.5 g) of Example 12 (1) were mixed. This liquid was cast onto a glass plate and was heated at 100° C. for three hours, and thus, a polymer electrolyte membrane was fabricated. The thickness of the membrane was 195 μm. This polymer electrolyte was observed with an optical microscope and an electron microscope in accordance with the above described method of M2, and as a result, it was found that its phases were, substantially uniformly mixed with each other. In addition, this polymer electrolyte was determined in accordance with the above described method of M3, and as a result, was found to include a cross linking polymer.

(3) Performance Evaluation of Polymer Electrolyte Membrane

When the performance of this membrane was evaluated in the same manner as in Example 17 (3), proton conductivity was 82 mS/cm, which was approximately the same as that of Nafion 117.

In addition, the fuel crossover (90 nmol/cm·minute) was 0.75 times lower than that of the Nafion 117 membrane, and the fuel crossover was suppressed.

The ratio of the amount of unfreezable water was 63% and the content of unfreezable water was 58%.

(4) Fabrication and Evaluation of Membrane Electrode Assembly

A membrane electrode assembly (MEA) and a fuel cell were fabricated and evaluated using a polymer electrolyte membrane of the above described (2) in accordance with the method of Example 1 (4).

The MEA that utilized a polymer electrolyte membrane of the above described (2) had excellent properties exhibiting values where the output (mW/cm$^2$) was 1.1 times greater and the energy capacity (Wh) was 1.6 times greater than those of the MEA (Comparative Example 1) that utilized Nafion 117.

EXAMPLE 32

(1) Synthesis of Sulfonated Polyether Ether Sulfone

Polyether ether sulfone (3.0 g) was dissolved in a concentrated sulfuric acid (150 ml) and the reaction was progressed for 4 days at room temperature while the solution was stirred. The gained mixture was placed in a large amount of ether and a white precipitation was filtered and washed and then dried so that sulfonated polyether ether sulfone was gained. This sulfonated polyether ether sulfone was dissolved in DMAc and a 20 wt % solution was gained.

(2) Hydrolysis of Silane Compound (2a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(2b) A 1 M hydrochloric acid solution (0.24 g) was added to a solution made of a compound (made by Gelest Inc., 0.80 g) represented by formula (K3) and DMAB (0.80 g) at 0° C., which was stirred for 30 minutes at room temperature so that colorless and transparent hydrolysate was gained.

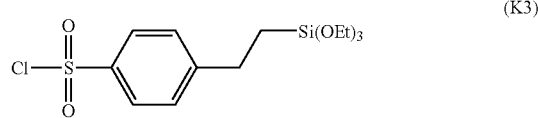

(K3)

(3) Fabrication of Polymer Electrolyte Membrane

The hydrolysate of the above described (2a) and (2b) and a sulfonated polyether ether sulfone DMAc solution (19.5 g) of the above described (1) were mixed. This liquid was cast onto a glass plate and was heated at 100° C. for three hours, and thus, a polymer electrolyte membrane was fabricated. The thickness of the membrane was 196 µm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(4) Performance Evaluation of Polymer Electrolyte Membrane

When the performance of this membrane was evaluated in the same manner as in Example 17 (3), proton conductivity was 74 mS/cm, which was approximately the same as that of Nafion 117.

In addition, the fuel crossover (95 nmol/cm·minute) was 0.79 times lower than that of the Nafion 117 membrane, and the fuel crossover was suppressed.

The ratio of the amount of unfreezable water was 55% and the content of unfreezable water was 50%.

(5) Fabrication and Evaluation of Membrane Electrode Assembly

A membrane electrode assembly (MEA) and a fuel cell were fabricated and evaluated using a polymer electrolyte membrane of the above described (3) in accordance with the method of Example 1 (4).

The MEA that utilized a polymer electrolyte membrane of the above described (3) had excellent properties exhibiting values where the output (mW/cm$^2$) was 1.1 times greater and the energy capacity (Wh) was 1.5 times greater than those of the MEA (Comparative Example 1) that utilized Nafion 117.

EXAMPLE 33

(1) Hydrolysis of Silane Compound (1a) A 1 M hydrochloric acid solution (0.68 g) was added to 1,6-bis(trimethoxy silyl) hexane made by Gelest Inc. (1.35 g) at 0° C., which was stirred for 30 minutes at room temperature so that colorless and transparent hydrolysate was gained.

(1b) A 1 M hydrochloric acid solution (1.0 g) was added to tetraisopropyl bis(3-trimethoxy silyl propyl) methane bis-phosphonate (1.0 g) at 0° C., which was stirred for 30 minutes at room temperature so that hydrolysate was gained.

(2) Fabrication of Polymer Electrolyte Membrane

The hydrolysate of the above described (1a) and (1b) and a 20 wt % solution (19.5 g) of N,N-dimethyl acetamide, which was the proton conductive polymer that had been gained in Example 16 (1), were mixed. This liquid was cast onto a glass plate and was heated at 100° C. for three hours, and thus, a polymer electrolyte membrane was fabricated. The thickness of the membrane was 220 µm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(3) Performance of Polymer Electrolyte Membrane

Measurements were carried out in accordance with the methods of Example 11 (3) to (5). Proton conductivity of the polymer electrolyte membrane was 0.090 S/cm, which was approximately the same as the proton conductivity (0.085 S/cm) of the Nafion 117 membrane.

In addition, the fuel crossover (25 nmol/cm·minute) was 0.21 times lower than that of the Nafion 117 membrane, and the fuel crossover was suppressed.

The ratio of the amount of unfreezable water was 82% and the content of unfreezable water was 49%, and thus, the ratio of unfreezable water was extremely great.

(4) Fabrication and Evaluation of Membrane Electrode Assembly

A membrane electrode assembly (MEA) and a fuel cell were fabricated and evaluated using a polymer electrolyte membrane of the above described (2) in accordance with the method of Example 1 (4).

The MEA that utilized a polymer electrolyte membrane of the above described (2) had excellent properties exhibiting values where the output (mW/cm$^2$) was 2.1 times greater and the energy capacity (Wh) was 3.0 times greater than those of the MEA (Comparative Example 1) that utilized Nafion 117.

EXAMPLE 34

(1) Fabrication of Polymer Electrolyte Solution

The proton conductive polymer that had been gained in Example 16 (1) was dissolved in N,N-dimethyl acetamide, and a 20 wt % solution was gained. This solution (10 g) and bisphenol A type epoxy resin "Epicoat 827" made by Yuka Shell Epoxy Co., Ltd. (0.5 g) were mixed and stirred well.

(2) Fabrication of Electrode

A treatment for water repellency was carried out on a carbon fiber cloth base using a suspension of 20% of polytetrafluoroethylene (PTFE), and after that, a carbon black dispersing liquid that included 20% of PTFE was applied, and an electrode base was fabricated through baking. An anode electrode catalyst coating liquid made of Pt—Ru carrying carbon and a solution of the above described (1) was applied to an electrode base which had been fabricated in the above manner and was then dried so that an anode electrode was fabricated, and a cathode electrode catalyst coating liquid made of Pt carrying carbon and a solution of the above described (1) was applied to an electrode base which had been fabricated in the above manner and was then dried so that a cathode electrode was fabricated.

(3) Fabrication of Membrane Electrode Assembly

A polymer electrolyte membrane that had been gained in Example 16 (2) was placed between an anode electrode and a cathode electrode which had been fabricated in the above described (2), and thus, a membrane electrode assembly (MEA) was fabricated through the application of heat and pressure.

(4) Evaluation of Membrane Electrode Assembly

A fuel cell was fabricated and evaluated using an MEA of the above described (3).

The MEA of the above described (3) had excellent properties exhibiting values where the output (mW/cm$^2$) was 1.8 times greater and the energy capacity (Wh) was 2.7 times greater than those of the MEA (Comparative Example 1) that utilized Nafion 117.

COMPARATIVE EXAMPLE 4

(1) Fabrication of Polymer Electrolyte Membrane

A composite membrane of divinyl benzene cross linking sulfonated polystyrene and polyvinylidene fluoride was fabricated in accordance with the method of Example 1 of Published Japanese Translation of International Publication No. 2001-504636.

This polymer electrolyte was observed with an optical microscope in accordance with the above described method of M2, and as a result, it was found that its phases were not mixed with each other.

(2) Performance of Polymer Electrolyte Membrane

Measurements were carried in accordance with the methods of Example 11 (3) to (5). Proton conductivity of the polymer electrolyte membrane that had been gained in the above described (1) was 0.090 S/cm, which was approximately the same as the proton conductivity (0.085 S/cm) of the Nafion 117 membrane.

In addition, the fuel crossover (218 nmol/cm·minute) was 1.82 times greater than that of the Nafion 117 membrane, and thus, the fuel crossover was great.

The ratio of the amount of unfreezable water was 28% and the content of unfreezable water was 58%.

COMPARATIVE EXAMPLE 5

(1) Fabrication of Polymer Electrolyte Membrane

A composite membrane of sulfonated polyphenylene oxide and polyvinylidene fluoride was fabricated in accordance with the method of Example 1 of U.S. Pat. No. 6,103,414.

This polymer electrolyte was observed with an optical microscope in accordance with the above described method of M2, and as a result, it was found that its phases were not mixed with each other. In addition, this polymer electrolyte was determined in accordance with the above described method of M3, and as a result, was found not to include a cross linking polymer.

(2) Performance of Polymer Electrolyte Membrane

Measurements were carried in accordance with the methods of Example 11 (3) to (5). Proton conductivity of the polymer electrolyte membrane that had been gained in the above described (1) was 0.10 S/cm, which was approximately the same as the proton conductivity (0.085 S/cm) of the Nafion 117 membrane.

In addition, the fuel crossover (205 nmol/cm·minute) was 1.71 times greater than that of the Nafion 117 membrane, and thus, the fuel crossover was great.

The ratio of the amount of unfreezable water was 36% and the content of unfreezable water was 54%.

EXAMPLE 35

(1) Fabrication of Proton Conductive Polymer

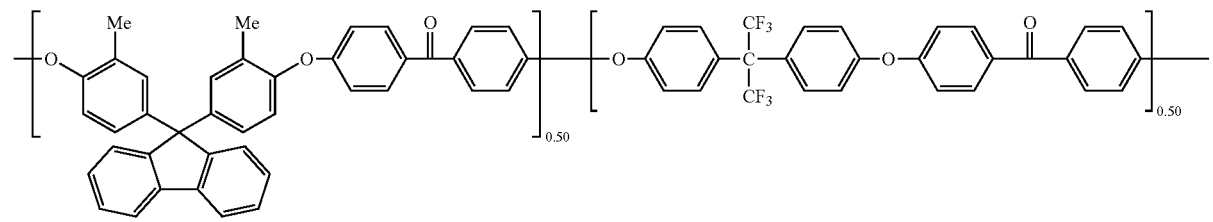

(T2)

35 g of potassium carbonate, 34 g of 4,4'-(hexafluloroisopropylidene) diphenol, 38 g of 4,4'-(9H-fluorene-9-ylidene) biscresol and 44 g of 4,4'-difluorobensophenon were polymerized in N-methyl pyrrolidone (NMP) at 160° C. The resulting material was extracted with water and after that precipitated again with a large amount of methanol, and thereby, refinement was carried out and a polymer represented by the above described formula (T2) was gained in a quantitative manner.

10 g of the above described polymer was dissolved in chloroform at room temperature in a nitrogen atmosphere and after that the solution was vigorously stirred while 14 mL of chlorosulfonic acid was slowly dropped so that the reaction was progressed for 5 minutes. A white precipitation was filtered, crushed and sufficiently washed with water and then dried so that the target proton conductive polymer was gained. The density of the sulfonic acid group of the gained proton conductive polymer was found through element analysis to be 2.3 mmol/g.

(2) Fabrication of Polymer Electrolyte Membrane

The proton conductive polymer that had been gained in the above described (1) was dissolved in N,N-dimethyl acetamide and a 20 wt % solution was gained. This solution (10 g) and fluorine-based epoxy resin "BPEF-G" made by Osaka Gas Chemicals Co., Ltd. (0.5 g) were mixed and stirred well. This liquid was cast onto a glass plate and was heated at 100°

C. for 3 hours so that a polymer electrolyte membrane was fabricated. The thickness of the membrane was 240 μm. This polymer electrolyte was observed with an optical microscope and an electron microscope in accordance with the above described method of M2, and as a result, it was found that its phases were substantially uniformly mixed with each other. In addition, this polymer electrolyte was determined in accordance with the above described method of M3, and as a result, was found to include a cross linking polymer.

(3) Performance of Polymer Electrolyte Membrane

Measurements were carried out in accordance with the methods of Example 11 (3) to (5). Proton conductivity of the polymer electrolyte membrane was 0.085 S/cm, which was approximately the same as the proton conductivity (0.085 S/cm) of the Nafion 117 membrane.

In addition, the fuel crossover (25 nmol/cm·minute) was 0.21 times lower than that of the Nafion 117 membrane, and the fuel crossover was suppressed.

The ratio of the amount of unfreezable water was 88% and the content of unfreezable water was 52%, and thus, the ratio of unfreezable water was extremely great.

EXAMPLE 36

(1) Hydrolysis of Silane Compound

A 1 M hydrochloric acid solution (0.68 g) was added to 1,6-bis(trimethoxy silyl) hexane made by Gelest Inc. (1.35 g), which was stirred for 30 minutes at room temperature so that colorless and transparent hydrolysate was gained.

(2) Fabrication of Polymer Electrolyte Membrane

The proton conductive polymer that had been gained in Example 35 (1) was dissolved in N,N-dimethyl acetamide, and a 20 wt % solution was gained This solution (10 g) and the hydrolysate (1 g) of the above described (1) were mixed. This liquid was cast onto a glass plate and was heated at 100° C. for 3 hours so as to fabricate a polymer electrolyte membrane. The thickness of the membrane was 240 μm. This polymer electrolyte was observed with an optical microscope and an electron microscope in accordance with the above described method of M2, and as a result , it was found that its phases were substantially uniformly mixed with each other. In addition, this polymer electrolyte was determined in accordance with the above described method of M3, and as a result, was found to include a cross linking polymer.

(3) Performance of Polymer Electrolyte Membrane

Measurements were carried out in accordance with the methods of Example 11 (3) to (5). Proton conductivity of the polymer electrolyte membrane was 0.083 S/cm, which was approximately the same as the proton conductivity (0.085 S/cm) of the Nafion 117 membrane.

In addition, the fuel crossover (38 nmol/cm·minute) was 0.32 times lower than that of the Nafion 117 membrane, and the fuel crossover was suppressed.

The ratio of the amount of unfreezable water was 81% and the content of unfreezable water was 47%, and thus, the ratio of unfreezable water was extremely great.

INDUSTRIAL APPLICABILITY

The present invention makes it possible to provide a polymer electrolyte where high proton conductivity and low fuel crossover are achieved at the same time. In addition, A polymer electrolyte membrane, a membrane electrode assembly and a polymer electrolyte fuel cell made of a polymer electrolyte according to the present invention make it possible to achieve high output and high energy density in a polymer electrolyte fuel cell.

The invention of claimed is:

1. A polymer electrolyte comprising a non-crosslinking proton conductive polymer (A) and a non proton conductive cross linking polymer (B), the proton conductive polymer (A) is a non-perfluorinated proton conductive polymer, and cross linking polymer (B) comprises a moiety selected from the group consisting of a radical polymerizing polymer, an epoxy based polymer, a melamine based polymer, a phenol resin based polymer, a urethane based polymer, a urea based polymer and an inorganic cross linking polymer, wherein a ratio of the amount of unfreezable water, represented by formula (S1), in said polymer electrolyte is no less than 40 wt % and no greater than 100 wt %, wherein the ratio of amount of unfreezable water (S1)=(amount of unfreezable water)/(amount of low melting point water+amount of unfreezable water)×100 (%) and wherein the ratio of the amount of unfreezable water in the polymer electrolyte to the weight of the polymer electrolyte when dried, which is represented by formula (S2), is no less than 20% and no higher than 200%, wherein the content of unfreezable water (S2)=(amount of unfreezable water in polymer electrolyte)/(weight of polymer electrolyte when dried)×100(%).

2. The polymer electrolyte according to claim 1, wherein said non-perfluorinated proton conductive polymer comprises an anionic group selected from a group consisting of a sulfonic acid group, a sulfone imide group, a sulfuric acid group, a phosphonic acid group, a phosphoric acid group and a carboxylic acid group.

3. The polymer electrolyte according to claim 1, wherein said non-perfluorinated proton conductive polymer is a proton conductive polymer having a polar group in a main chain.

4. The polymer electrolyte according to claim 3, wherein the polar group comprises a moiety selected from the group consisting of a sulfonyl group, an oxy group, a thio group, a carbonyl group, a phosphine oxide group, a phosphonate group, an ester group, an amide group, an imide group and a phosphagen group in said proton conductive polymer.

5. The polymer electrolyte according to claim 3, wherein said proton conductive polymer comprises an aromatic based polymer having repeating units that can be represented by the following formula (P1)

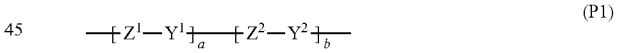

(P1)

wherein, $Z^1$ and $Z^2$ indicate an organic group that includes an aromatic ring and each of these may indicate two or more types of groups; $Y^1$ indicates an electron withdrawing group; $Y^2$ indicates O or S; and a and b indicate independent integers from 0 to 2, where a and b are not zero simultaneously.

6. The polymer electrolyte according to claim 1, wherein proton conductive polymer (A) is substantially uniformly mixed with the cross linking polymer (B).

7. The polymer electrolyte according to claim 1, wherein said cross linking polymer (B) is an inorganic cross linking polymer, and the inorganic cross linking polymer has an anionic group.

8. The polymer electrolyte according to claim 7, wherein the anionic group of said inorganic cross linking polymer comprises a moiety selected from the group consisting of a sulfonic acid group, a sulfone imide group, a phosphonic acid group, a phosphoric acid group and a carboxyl group.

9. A polymer electrolyte membrane comprising the polymer electrolyte according to claim 1.

10. A membrane electrode assembly, comprising the polymer electrolyte according to claim 1.

11. A polymer electrolyte fuel cell, comprising the polymer electrolyte according to claim 1.

12. The polymer electrolyte fuel cell according to claim 11, wherein the fuel cell is a direct type fuel cell adapted to use a fuel comprising alcohol and dimethyl ether.

13. A membrane electrode assembly, comprising the polymer electrolyte membrane according to claim 9.

14. A polymer electrolyte fuel cell, comprising the polymer electrolyte membrane according to claim 9.

15. The polymer electrode fuel cell of claim 12, wherein the fuel further comprises water and the alcohol has a carbon number of 1 to 3.

* * * * *